(12) United States Patent
Brown

(10) Patent No.: US 7,940,189 B2
(45) Date of Patent: May 10, 2011

(54) LEAK DETECTOR FOR PROCESS VALVE

(75) Inventor: Gregory C. Brown, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 287 days.

(21) Appl. No.: 12/066,431

(22) PCT Filed: Sep. 26, 2006

(86) PCT No.: PCT/US2006/037535
§ 371 (c)(1),
(2), (4) Date: Sep. 9, 2008

(87) PCT Pub. No.: WO2007/041111
PCT Pub. Date: Apr. 12, 2007

(65) Prior Publication Data
US 2009/0303057 A1  Dec. 10, 2009

(51) Int. Cl.
*G08B 21/00* (2006.01)
(52) U.S. Cl. .................. 340/621; 340/605
(58) Field of Classification Search ............. 340/605, 340/604, 611, 615, 619, 620, 621, 626; 73/587, 73/592, 659, 40; 137/487.5, 552
See application file for complete search history.

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,592,967 A | 7/1971 | Harris | 179/1 |
| 3,618,592 A | 11/1971 | Stewart | 128/2.05 R |
| 3,633,053 A | 1/1972 | Peters | 310/15 |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,814,207 A | 6/1974 | Kusuda et al. | 181/0.5 |
| 3,849,637 A | 11/1974 | Caruso et al. | 235/151 |
| 3,855,858 A | 12/1974 | Cushing | 73/194 EM |
| 3,938,544 A | 2/1976 | Bernaerts | 137/334 |
| 3,948,098 A | 4/1976 | Richardson et al. | 73/861.24 |
| 3,952,759 A | 4/1976 | Ottenstein | 137/12 |
| 3,964,296 A | 6/1976 | Matzuk | 73/67.5 |

(Continued)

FOREIGN PATENT DOCUMENTS

CA       999950       11/1976

(Continued)

OTHER PUBLICATIONS

"Invitation to Pay Additional Fees" for PCT/US2006/037535, filed Sep. 26, 2006; 7 pages.
"First Office Action" for related Chinese Application No. 2005800100704, dated prior to Jan. 19, 2009; 2 pages.
"Invitation to Pay Additional Fees" PCT/US2006/037535, filed Sep. 26, 2006, 7 pages.
European Office Action from EP Application No. 06815490.5, dated Sep. 10, 2008.

(Continued)

*Primary Examiner* — Van T. Trieu
(74) *Attorney, Agent, or Firm* — Westman, Champlin and Kelly, P.A.

(57) ABSTRACT

A leak detection system is described for detecting a leak through a closed valve disposed between an upstream pipe and a downstream pipe of an industrial process. An insertable plate is coupled to the valve in the pipe in-line with the fluid flow. A sensor couples to the flow and provides a signature output. A leak detector is coupled to the sensor and adapted to detect a leak through the valve based upon the signature output.

23 Claims, 9 Drawing Sheets

U.S. PATENT DOCUMENTS

| | | | |
|---|---|---|---|
| 3,973,184 A | 8/1976 | Raber | 324/51 |
| RE29,383 E | 9/1977 | Gallatin et al. | 137/14 |
| 4,051,714 A | 10/1977 | Fechter et al. | 73/40.5 |
| 4,058,975 A | 11/1977 | Gilbert et al. | 60/39.28 |
| 4,066,095 A | 1/1978 | Massa | 137/486 |
| 4,083,031 A | 4/1978 | Pharo, Jr. | 367/135 |
| 4,099,413 A | 7/1978 | Ohte et al. | 73/359 |
| 4,102,199 A | 7/1978 | Tslpouras | 73/362 |
| 4,122,719 A | 10/1978 | Carlson et al. | 73/342 |
| 4,237,454 A | 12/1980 | Meyer | 340/682 |
| 4,249,164 A | 2/1981 | Tivy | 340/870.3 |
| 4,250,490 A | 2/1981 | Dahlke | 340/870.37 |
| 4,255,964 A | 3/1981 | Morison | 73/24.01 |
| 4,279,013 A | 7/1981 | Cameron et al. | 340/870.37 |
| 4,287,581 A | 9/1981 | Neale, Sr. | 367/135 |
| 4,289,019 A | 9/1981 | Claytor | 73/40.5 |
| 4,292,769 A | 10/1981 | Maag et al. | 451/9 |
| 4,337,516 A | 6/1982 | Murphy et al. | 364/551 |
| 4,355,536 A | 10/1982 | McShane et al. | 73/633 |
| 4,383,443 A | 5/1983 | Langdon | 73/290 |
| 4,390,321 A | 6/1983 | Langlois et al. | 417/15 |
| 4,393,711 A | 7/1983 | Lapides | 73/592 |
| 4,399,824 A | 8/1983 | Davidson | 128/736 |
| 4,417,312 A | 11/1983 | Cronin et al. | 364/510 |
| 4,423,634 A | 1/1984 | Audenard et al. | 73/587 |
| 4,435,974 A | 3/1984 | Fuchs et al. | 73/40.5 |
| 4,446,741 A | 5/1984 | Sirokorad et al. | 73/654 |
| 4,448,062 A | 5/1984 | Peterson et al. | 73/86 |
| 4,459,858 A | 7/1984 | Marsh | 73/861.12 |
| 4,463,612 A | 8/1984 | Thompson | 73/861.22 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,536,753 A | 8/1985 | Parker | 340/566 |
| 4,540,468 A | 9/1985 | Genco et al. | 162/49 |
| 4,543,817 A | 10/1985 | Sugiyama | 73/40.5 |
| 4,571,689 A | 2/1986 | Hildebrand et al. | 364/481 |
| 4,630,265 A | 12/1986 | Sexton | 370/85 |
| 4,635,214 A | 1/1987 | Kasai et al. | 364/551 |
| 4,641,529 A | 2/1987 | Lorenzi et al. | 73/601 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,686,638 A | 8/1987 | Furuse | 364/558 |
| 4,696,191 A | 9/1987 | Claytor et al. | 73/600 |
| 4,705,212 A | 11/1987 | Miller et al. | 236/54 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,758,308 A | 7/1988 | Carr | 162/263 |
| 4,777,585 A | 10/1988 | Kokawa et al. | 364/164 |
| 4,807,151 A | 2/1989 | Citron | 364/510 |
| 4,818,994 A | 4/1989 | Orth et al. | 340/501 |
| 4,821,769 A | 4/1989 | Mills et al. | 137/554 |
| 4,831,564 A | 5/1989 | Suga | 364/551.01 |
| 4,833,922 A | 5/1989 | Frick et al. | 73/756 |
| 4,841,286 A | 6/1989 | Kummer | 340/653 |
| 4,853,693 A | 8/1989 | Eaton-Williams | 340/588 |
| 4,858,462 A | 8/1989 | Coulter et al. | 73/40.5 |
| 4,866,628 A | 9/1989 | Natarajan | 700/102 |
| 4,873,655 A | 10/1989 | Kondraske | 364/553 |
| 4,895,031 A | 1/1990 | Cage | 73/861.355 |
| 4,907,167 A | 3/1990 | Skeirik | 364/500 |
| 4,913,670 A | 4/1990 | Spranger | 440/49 |
| 4,924,418 A | 5/1990 | Bachman et al. | 364/550 |
| 4,925,628 A | 5/1990 | Metzger et al. | 422/100 |
| 4,926,364 A | 5/1990 | Brotherton | 364/581 |
| 4,934,196 A | 6/1990 | Romano | 73/861.38 |
| 4,939,753 A | 7/1990 | Olson | 375/107 |
| 4,954,060 A | 9/1990 | Hsu | 425/150 |
| 4,964,125 A | 10/1990 | Kim | 371/15.1 |
| 4,979,125 A | 12/1990 | Kwun et al. | 702/35 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,008,841 A | 4/1991 | McElroy | 364/551.01 |
| 5,014,543 A | 5/1991 | Franklin et al. | 73/40.5 |
| 5,015,949 A | 5/1991 | Koch et al. | 324/207.25 |
| 5,019,760 A | 5/1991 | Chu et al. | 318/490 |
| 5,025,344 A | 6/1991 | Maly et al. | 361/88 |
| 5,031,446 A | 7/1991 | Saito et al. | 73/40.5 |
| 5,038,614 A | 8/1991 | Bseisu et al. | 73/592 |
| 5,043,862 A | 8/1991 | Takahashi et al. | 364/162 |
| 5,047,990 A | 9/1991 | Gafos et al. | 367/6 |
| 5,053,815 A | 10/1991 | Wendell | 355/208 |
| 5,057,774 A | 10/1991 | Verhelst et al. | 324/537 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,089,997 A | 2/1992 | Pecukonis | 367/135 |
| 5,094,109 A | 3/1992 | Dean et al. | 73/718 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| RE33,977 E | 6/1992 | Goodman et al. | 73/40.5 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,136,876 A | 8/1992 | Taylor | 73/40.5 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,144,839 A | 9/1992 | Lochner | 73/609 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,267,241 A | 11/1993 | Kowal | 714/706 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,329,465 A | 7/1994 | Arcella et al. | 364/551.01 |
| 5,333,240 A | 7/1994 | Matsumoto et al. | 395/23 |
| 5,333,501 A | 8/1994 | Okada et al. | 73/592 |
| 5,340,271 A | 8/1994 | Freeman et al. | 415/1 |
| 5,343,737 A | 9/1994 | Baumoel | 73/40.5 |
| 5,345,812 A | 9/1994 | Haboian | 73/46 |
| 5,347,843 A | 9/1994 | Orr et al. | 73/3 |
| 5,349,541 A | 9/1994 | Alexandro, Jr. et al. | 364/578 |
| 5,349,568 A | 9/1994 | Kupperman et al. | 367/125 |
| 5,355,324 A | 10/1994 | Zhang | 364/510 |
| 5,357,449 A | 10/1994 | Oh | 364/551.01 |
| 5,361,628 A | 11/1994 | Marko et al. | 73/116 |
| 5,361,636 A | 11/1994 | Farstad et al. | 73/592 |
| 5,365,423 A | 11/1994 | Chand | 364/140 |
| 5,365,787 A | 11/1994 | Hernandez et al. | 73/660 |
| 5,367,612 E | 11/1994 | Bozich et al. | 395/22 |
| 5,369,674 A | 11/1994 | Yokose et al. | 376/245 |
| 5,372,041 A | 12/1994 | Yoshida et al. | 73/514.31 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,392,293 A | 2/1995 | Hsue | 324/765 |

| | | | |
|---|---|---|---|
| 5,394,341 A | 2/1995 | Kepner .................... 364/551.01 |
| 5,394,543 A | 2/1995 | Hill et al. ...................... 395/575 |
| 5,400,645 A | 3/1995 | Kunze et al. ................... 73/40.5 |
| 5,404,064 A | 4/1995 | Mermelstein et al. ........ 310/319 |
| 5,408,406 A | 4/1995 | Mathur et al. ................. 364/163 |
| 5,408,586 A | 4/1995 | Skeirik ........................... 395/23 |
| 5,410,495 A | 4/1995 | Ramamurthi ............ 364/511.05 |
| 5,414,645 A | 5/1995 | Hirano .................... 364/551.01 |
| 5,416,724 A | 5/1995 | Savic ............................ 364/509 |
| 5,419,197 A | 5/1995 | Ogi et al. ........................ 73/659 |
| 5,430,642 A | 7/1995 | Nakajima et al. ............. 364/148 |
| 5,433,104 A | 7/1995 | Kunze et al. ................... 73/40.5 |
| 5,434,774 A | 7/1995 | Seberger ....................... 364/172 |
| 5,436,705 A | 7/1995 | Raj ............................... 355/246 |
| 5,440,478 A | 8/1995 | Fisher et al. .................. 364/188 |
| 5,442,639 A | 8/1995 | Crowder et al. ............. 371/20.1 |
| 5,453,944 A | 9/1995 | Baumoel ....................... 364/578 |
| 5,467,355 A | 11/1995 | Umeda et al. ............ 364/571.04 |
| 5,469,070 A | 11/1995 | Koluvek ....................... 324/713 |
| 5,469,156 A | 11/1995 | Kogura .................... 340/870.38 |
| 5,469,735 A | 11/1995 | Watanabe ..................... 73/118.1 |
| 5,469,749 A | 11/1995 | Shimada et al. ........... 73/861.47 |
| 5,481,199 A | 1/1996 | Anderson et al. ............. 324/705 |
| 5,481,200 A | 1/1996 | Voegele et al. ............... 324/718 |
| 5,483,387 A | 1/1996 | Bauhahn et al. .............. 359/341 |
| 5,485,753 A | 1/1996 | Burns et al. .................... 73/720 |
| 5,486,996 A | 1/1996 | Samad et al. ................. 364/152 |
| 5,488,697 A | 1/1996 | Kaemmerer et al. ........... 395/51 |
| 5,489,831 A | 2/1996 | Harris ........................... 318/701 |
| 5,495,769 A | 3/1996 | Broden et al. .................. 73/718 |
| 5,497,661 A | 3/1996 | Stripf et al. ................... 73/611 |
| 5,510,779 A | 4/1996 | Maltby et al. .............. 340/870.3 |
| 5,511,004 A | 4/1996 | Dubost et al. ............ 364/551.01 |
| 5,526,293 A | 6/1996 | Mozumder et al. ........... 364/578 |
| 5,533,383 A | 7/1996 | Greene et al. ................. 73/40.5 |
| 5,535,136 A | 7/1996 | Standifer ...................... 364/510 |
| 5,538,162 A | 7/1996 | Reh et al. ........................ 222/63 |
| 5,539,638 A | 7/1996 | Keeler et al. ............. 364/424.03 |
| 5,548,528 A | 8/1996 | Keeler et al. ................. 364/497 |
| 5,548,530 A | 8/1996 | Baumoel ....................... 364/509 |
| 5,549,137 A | 8/1996 | Lenz et al. .................... 137/486 |
| 5,555,190 A | 9/1996 | Derby et al. .................. 364/510 |
| 5,557,969 A | 9/1996 | Jordan ............................ 73/592 |
| 5,558,115 A | 9/1996 | Lenz et al. ...................... 137/86 |
| 5,560,246 A | 10/1996 | Bottinger et al. .......... 73/861.15 |
| 5,561,599 A | 10/1996 | Lu ................................. 364/164 |
| 5,570,034 A | 10/1996 | Needham et al. ............. 324/763 |
| 5,570,300 A | 10/1996 | Henry et al. ............. 364/551.01 |
| 5,572,420 A | 11/1996 | Lu ................................. 364/153 |
| 5,572,438 A | 11/1996 | Ehlers et al. .................. 700/295 |
| 5,573,032 A | 11/1996 | Lenz et al. .................... 137/486 |
| 5,578,763 A | 11/1996 | Spencer et al. ............ 73/861.08 |
| 5,591,922 A | 1/1997 | Segeral et al. ............. 73/861.04 |
| 5,598,521 A | 1/1997 | Kilgore et al. ................ 395/326 |
| 5,600,148 A | 2/1997 | Cole et al. ................... 250/495.1 |
| 5,608,650 A | 3/1997 | McClendon et al. ......... 364/510 |
| 5,616,829 A | 4/1997 | Balaschak et al. ............... 73/46 |
| 5,623,421 A | 4/1997 | Savic ............................ 364/510 |
| 5,623,605 A | 4/1997 | Keshav et al. ........... 395/200.17 |
| 5,629,870 A | 5/1997 | Farag et al. .............. 364/551.01 |
| 5,633,809 A | 5/1997 | Wissenbach et al. ........ 364/510 |
| 5,637,802 A | 6/1997 | Frick et al. ...................... 73/718 |
| 5,640,491 A | 6/1997 | Bhat et al. ...................... 395/22 |
| 5,644,240 A | 7/1997 | Brugger ........................ 324/439 |
| 5,650,943 A * | 7/1997 | Powell et al. ................... 702/51 |
| 5,654,869 A | 8/1997 | Ohi et al. ...................... 361/540 |
| 5,661,668 A | 8/1997 | Yemini et al. ................ 364/550 |
| 5,665,899 A | 9/1997 | Willcox ......................... 73/1.63 |
| 5,668,322 A | 9/1997 | Broden ........................... 73/756 |
| 5,669,713 A | 9/1997 | Schwartz et al. ................ 374/1 |
| 5,671,335 A | 9/1997 | Davis et al. ..................... 395/23 |
| 5,672,247 A | 9/1997 | Pangalos et al. ................ 162/65 |
| 5,675,504 A | 10/1997 | Serodes et al. ............... 364/496 |
| 5,675,506 A | 10/1997 | Savic ............................ 364/509 |
| 5,675,724 A | 10/1997 | Beal et al. ................ 395/182.02 |
| 5,680,109 A | 10/1997 | Lowe et al. ................... 340/608 |
| 5,682,317 A | 10/1997 | Keeler et al. ............. 364/431.03 |
| 5,682,476 A | 10/1997 | Tapperson et al. ........... 370/225 |
| 5,687,323 A | 11/1997 | Hodroff ........................ 395/230 |
| 5,700,090 A | 12/1997 | Eryurek ........................ 374/210 |
| 5,703,575 A | 12/1997 | Kirkpatrick ............. 340/870.17 |
| 5,704,011 A | 12/1997 | Hansen et al. .................. 395/22 |
| 5,705,754 A | 1/1998 | Keita et al. ............... 73/861.357 |
| 5,705,978 A | 1/1998 | Frick et al. .................... 340/511 |
| 5,708,211 A | 1/1998 | Jepson et al. .............. 73/861.04 |
| 5,708,585 A | 1/1998 | Kushion .................. 364/431.061 |
| 5,710,370 A | 1/1998 | Shanahan et al. ............. 73/1.35 |
| 5,710,708 A | 1/1998 | Wiegand .................... 364/470.1 |
| 5,710,956 A | 1/1998 | Kurohata et al. ............... 399/24 |
| 5,713,668 A | 2/1998 | Lunghofer et al. ........... 374/179 |
| 5,719,378 A | 2/1998 | Jackson, Jr. et al. .......... 219/497 |
| 5,719,785 A | 2/1998 | Standifer ...................... 364/510 |
| 5,731,522 A | 3/1998 | Sittler ............................. 73/708 |
| 5,736,649 A | 4/1998 | Kawasaki et al. .......... 73/861.23 |
| 5,741,074 A | 4/1998 | Wang et al. ................... 374/185 |
| 5,742,845 A | 4/1998 | Wagner ......................... 395/831 |
| 5,746,511 A | 5/1998 | Eryurek et al. .................. 374/2 |
| 5,747,701 A | 5/1998 | Marsh et al. ............... 73/861.23 |
| 5,752,008 A | 5/1998 | Bowling ....................... 395/500 |
| 5,756,898 A | 5/1998 | Diatschenko et al. .......... 73/592 |
| 5,764,539 A | 6/1998 | Rani .............................. 364/557 |
| 5,764,891 A | 6/1998 | Warrior ..................... 395/200.2 |
| 5,781,024 A | 7/1998 | Blomberg et al. ............ 324/763 |
| 5,781,878 A | 7/1998 | Mizoguchi et al. ........... 701/109 |
| 5,790,413 A | 8/1998 | Bartusiak et al. ............. 364/485 |
| 5,796,006 A | 8/1998 | Bellet et al. .................... 73/661 |
| 5,801,689 A | 9/1998 | Huntsman .................... 345/329 |
| 5,805,442 A | 9/1998 | Crater et al. .................. 364/138 |
| 5,817,950 A | 10/1998 | Wiklund et al. ........... 73/861.66 |
| 5,825,664 A | 10/1998 | Warrior et al. ................... 700/7 |
| 5,828,567 A | 10/1998 | Eryurek et al. ................. 700/79 |
| 5,829,876 A | 11/1998 | Schwartz et al. ................ 374/1 |
| 5,848,383 A | 12/1998 | Yunus ........................... 702/102 |
| 5,854,993 A | 12/1998 | Grichnik ......................... 702/54 |
| 5,854,994 A | 12/1998 | Canada et al. ................... 702/56 |
| 5,859,964 A | 1/1999 | Wang et al. ............... 395/185.01 |
| 5,869,772 A | 2/1999 | Storer ......................... 73/861.24 |
| 5,874,676 A | 2/1999 | Maki, Jr. ......................... 73/579 |
| 5,876,122 A | 3/1999 | Eryurek ........................ 374/183 |
| 5,880,376 A | 3/1999 | Sai et al. .................... 73/861.08 |
| 5,887,978 A | 3/1999 | Lunghofer et al. ........... 374/179 |
| 5,908,990 A | 6/1999 | Cummings ................ 73/861.22 |
| 5,920,016 A | 7/1999 | Broden ........................... 73/756 |
| 5,923,557 A | 7/1999 | Eidson .................... 364/471.03 |
| 5,924,086 A | 7/1999 | Mathur et al. .................. 706/25 |
| 5,926,778 A | 7/1999 | Pöppel .......................... 702/130 |
| 5,934,371 A | 8/1999 | Bussear et al. .................. 166/53 |
| 5,936,514 A | 8/1999 | Anderson et al. ........ 340/310.01 |
| 5,940,290 A | 8/1999 | Dixon ........................... 364/138 |
| 5,956,663 A | 9/1999 | Eryurek et al. ............... 702/183 |
| 5,962,131 A | 10/1999 | Schwind et al. .............. 428/364 |
| 5,970,430 A | 10/1999 | Burns et al. ................... 702/122 |
| 5,995,910 A | 11/1999 | Discenzo ........................ 702/56 |
| 6,002,952 A | 12/1999 | Diab et al. .................... 600/310 |
| 6,006,338 A | 12/1999 | Longsdorf et al. ........... 713/340 |
| 6,014,612 A | 1/2000 | Larson et al. ................. 702/183 |
| 6,014,902 A | 1/2000 | Lewis et al. ................. 73/861.12 |
| 6,016,523 A | 1/2000 | Zimmerman et al. .......... 710/63 |
| 6,016,706 A | 1/2000 | Yamamoto et al. ................ 9/6 |
| 6,017,143 A | 1/2000 | Eryurek et al. ................. 700/51 |
| 6,023,399 A | 2/2000 | Kogure .......................... 361/23 |
| 6,026,352 A | 2/2000 | Burns et al. ................... 702/182 |
| 6,038,579 A | 3/2000 | Sekine .......................... 708/400 |
| 6,045,260 A | 4/2000 | Schwartz et al. ............. 374/183 |
| 6,046,642 A | 4/2000 | Brayton et al. ............... 330/296 |
| 6,047,220 A | 4/2000 | Eryurek et al. ................. 700/28 |
| 6,047,222 A | 4/2000 | Burns et al. ..................... 700/79 |
| 6,052,655 A | 4/2000 | Kobayashi et al. ........... 702/184 |
| 6,059,254 A | 5/2000 | Sundet et al. ................. 248/678 |
| 6,061,603 A | 5/2000 | Papadopoulos et al. ........ 700/83 |
| 6,069,560 A | 5/2000 | Larsson ........................ 340/540 |
| 6,072,150 A | 6/2000 | Sheffer ..................... 219/121.83 |
| 6,094,600 A | 7/2000 | Sharpe, Jr. et al. ............. 700/19 |
| 6,112,131 A | 8/2000 | Ghorashi et al. ............. 700/142 |
| 6,119,047 A | 9/2000 | Eryurek et al. ................. 700/28 |
| 6,119,529 A | 9/2000 | Di Marco et al. .......... 73/861.68 |
| 6,128,946 A | 10/2000 | Leon et al. ........................ 73/46 |
| 6,139,180 A | 10/2000 | Usher et al. ...................... 374/1 |

| | | | | | | | |
|---|---|---|---|---|---|---|---|
| 6,151,560 | A | 11/2000 | Jones .................... 702/58 | 6,951,133 | B2 | 10/2005 | Passarelli .................. 73/643 |
| 6,179,964 | B1 | 1/2001 | Begemann et al. ........... 162/198 | 6,970,003 | B2 | 11/2005 | Rome et al. ............... 324/718 |
| 6,182,501 | B1 | 2/2001 | Furuse et al. ............ 73/49.2 | 6,976,503 | B2 * | 12/2005 | Ens et al. ................. 137/552 |
| 6,192,281 | B1 | 2/2001 | Brown et al. ............ 700/2 | 7,010,459 | B2 | 3/2006 | Eryurek et al. ............ 702/182 |
| 6,195,591 | B1 | 2/2001 | Nixon et al. ............ 700/2 | 7,018,800 | B2 | 3/2006 | Huisenga et al. .............. 435/6 |
| 6,199,018 | B1 | 3/2001 | Quist et al. ............. 702/34 | 7,023,205 | B1 | 4/2006 | Krupp ..................... 324/239 |
| 6,209,048 | B1 | 3/2001 | Wolff ..................... 710/62 | 7,035,773 | B2 | 4/2006 | Keyes et al. ............ 702/188 |
| 6,236,948 | B1 | 5/2001 | Eck et al. ............ 702/45 | 7,036,381 | B2 | 5/2006 | Broden et al. ................ 73/708 |
| 6,237,424 | B1 | 5/2001 | Salmasi et al. ........... 73/861.17 | 7,040,179 | B2 | 5/2006 | Drahm et al. ........... 73/861.356 |
| 6,260,004 | B1 | 7/2001 | Hays et al. ............ 702/183 | 7,058,542 | B2 | 6/2006 | Hauhia et al. ............ 702/183 |
| 6,263,487 | B1 | 7/2001 | Stripf et al. ............. 717/1 | 7,085,610 | B2 | 8/2006 | Eryurek et al. ............ 700/29 |
| 6,272,438 | B1 | 8/2001 | Cunningham et al. ........ 702/56 | 7,099,852 | B2 | 8/2006 | Unsworth et al. ............ 706/23 |
| 6,279,645 | B1 | 8/2001 | McGlade et al. ........ 164/151.5 | 7,109,883 | B2 | 9/2006 | Trimble et al. ........... 340/870.16 |
| 6,289,723 | B1 | 9/2001 | Leon .................... 73/49.8 | 7,114,516 | B2 * | 10/2006 | Ito ............................ 137/487.5 |
| 6,289,735 | B1 | 9/2001 | Dister et al. ................ 73/579 | 7,137,307 | B2 | 11/2006 | Huybrechts et al. ........ 73/861.12 |
| 6,298,377 | B1 | 10/2001 | Hartikainen et al. ......... 709/223 | 7,171,281 | B2 | 1/2007 | Weber et al. ............ 700/96 |
| 6,298,454 | B1 | 10/2001 | Schleiss et al. ............ 714/37 | 7,254,518 | B2 | 8/2007 | Eryurek et al. ............ 702/183 |
| 6,307,483 | B1 | 10/2001 | Westfield et al. ......... 340/870.11 | 7,258,021 | B2 | 8/2007 | Broden ..................... 73/756 |
| 6,311,136 | B1 | 10/2001 | Henry et al. ............ 702/45 | 7,258,024 | B2 | 8/2007 | Dimarco et al. ........... 73/861.22 |
| 6,317,701 | B1 | 11/2001 | Pyotsia et al. ............ 702/188 | 7,290,450 | B2 | 11/2007 | Brown et al. ............... 73/579 |
| 6,327,914 | B1 | 12/2001 | Dutton .................. 73/861.356 | 7,321,846 | B1 | 1/2008 | Huisenga et al. ............ 702/183 |
| 6,330,525 | B1 | 12/2001 | Hays et al. ............ 702/183 | 7,435,581 | B2 | 10/2008 | West .................. 435/289.1 |
| 6,347,252 | B1 | 2/2002 | Behr et al. ............ 700/2 | 2002/0013629 | A1 | 1/2002 | Nixon et al. |
| 6,356,191 | B1 | 3/2002 | Kirkpatrick et al. ......... 340/501 | 2002/0029808 | A1 * | 3/2002 | Friend et al. ................ 137/551 |
| 6,360,277 | B1 | 3/2002 | Ruckley et al. ............. 9/250 | 2002/0032544 | A1 | 3/2002 | Reid et al. ............ 702/183 |
| 6,367,328 | B1 | 4/2002 | Gorman et al. ............ 73/592 | 2002/0077711 | A1 | 6/2002 | Nixon et al. ............ 700/19 |
| 6,370,448 | B1 | 4/2002 | Eryurek et al. ............ 700/282 | 2002/0078752 | A1 | 6/2002 | Braunling et al. ............ 73/627 |
| 6,377,859 | B1 | 4/2002 | Brown et al. ............ 700/79 | 2002/0121910 | A1 | 9/2002 | Rome et al. ............ 324/718 |
| 6,378,364 | B1 | 4/2002 | Pelletier et al. ........... 73/152.47 | 2002/0145568 | A1 | 10/2002 | Winter ..................... 343/701 |
| 6,396,426 | B1 | 5/2002 | Balard et al. ............. 341/120 | 2002/0148644 | A1 | 10/2002 | Schultz et al. ............ 175/39 |
| 6,397,114 | B1 | 5/2002 | Eryurek et al. ............ 700/51 | 2002/0194547 | A1 | 12/2002 | Christensen et al. ........... 714/43 |
| 6,405,099 | B1 | 6/2002 | Nagai et al. ............ 700/159 | 2003/0014536 | A1 | 1/2003 | Christensen et al. ........... 709/238 |
| 6,425,038 | B1 | 7/2002 | Sprecher .................. 710/269 | 2003/0033040 | A1 | 2/2003 | Billings .................. 700/97 |
| 6,434,504 | B1 | 8/2002 | Eryurek et al. ............ 702/130 | 2003/0033133 | A1 | 2/2003 | Yutkowitz ............... 702/105 |
| 6,442,999 | B1 | 9/2002 | Baumoel .................. 73/40.5 | 2003/0036868 | A1 | 2/2003 | Yutkowitz ............... 702/105 |
| 6,449,574 | B1 | 9/2002 | Eryurek et al. ............ 702/99 | 2003/0045962 | A1 | 3/2003 | Eryurek et al. |
| 6,473,656 | B1 | 10/2002 | Langels et al. ............ 700/17 | 2003/0056147 | A1 | 3/2003 | Yutkowitz ............... 714/25 |
| 6,473,710 | B1 | 10/2002 | Eryurek ................. 702/133 | 2003/0056602 | A1 | 3/2003 | Cushing .................. 73/861 |
| 6,480,793 | B1 | 11/2002 | Martin .................... 702/45 | 2003/0066638 | A1 | 4/2003 | Qu et al. ............... 165/186 |
| 6,492,921 | B1 | 12/2002 | Kunitani et al. ........... 341/118 | 2003/0196143 | A1 | 10/2003 | Puri et al. ............... 714/30 |
| 6,493,689 | B2 | 12/2002 | Kotoulas et al. ............ 706/23 | 2003/0229864 | A1 | 12/2003 | Watkins .................. 716/4 |
| 6,497,222 | B2 | 12/2002 | Bolz et al. ............. 123/476 | 2004/0025593 | A1 | 2/2004 | Hashimoto et al. ............ 73/643 |
| 6,505,517 | B1 | 1/2003 | Eryurek et al. ............ 73/861.08 | 2004/0075747 | A1 | 4/2004 | Silverbrook ............ 348/207.99 |
| 6,519,546 | B1 | 2/2003 | Eryurek et al. ............ 702/130 | 2004/0093174 | A1 | 5/2004 | Lander .................. 702/56 |
| 6,530,259 | B1 * | 3/2003 | Kelly et al. ............. 73/23.2 | 2004/0111690 | A1 | 6/2004 | Reuland et al. ............ 716/17 |
| 6,532,392 | B1 | 3/2003 | Eryurek et al. ............ 700/54 | 2004/0112115 | A1 | 6/2004 | Ramamoorthy et al. ....... 73/1.01 |
| 6,539,267 | B1 | 3/2003 | Eryurek et al. ............ 700/51 | 2004/0117744 | A1 | 6/2004 | Nation et al. ............ 716/1 |
| 6,543,551 | B1 | 4/2003 | Sparks et al. ............ 175/52 | 2004/0128034 | A1 | 7/2004 | Lenker et al. ............ 700/282 |
| 6,546,814 | B1 | 4/2003 | Choe et al. ........... 73/862.08 | 2004/0199361 | A1 | 10/2004 | Lu et al. ............ 702/183 |
| 6,550,314 | B2 | 4/2003 | Summers et al. ............ 73/46 | 2004/0249583 | A1 | 12/2004 | Eryurek et al. ............ 702/47 |
| 6,556,145 | B1 | 4/2003 | Kirkpatrick et al. ......... 340/870.17 | 2005/0011278 | A1 | 1/2005 | Brown et al. ............ 73/861.18 |
| 6,561,038 | B2 | 5/2003 | Gravel et al. ............ 73/729.2 | 2005/0072239 | A1 | 4/2005 | Longsdorf et al. ............ 73/649 |
| 6,564,268 | B1 | 5/2003 | Davis et al. ............ 710/11 | 2005/0132826 | A1 | 6/2005 | Brown et al. ............ 73/592 |
| 6,567,006 | B1 | 5/2003 | Lander et al. ............ 340/605 | 2005/0168343 | A1 | 8/2005 | Longsdorf et al. ............ 340/664 |
| 6,584,847 | B1 | 7/2003 | Hirose .................. 73/579 | 2005/0284237 | A1 | 12/2005 | Henry et al. ............ 73/861.356 |
| 6,594,603 | B1 | 7/2003 | Eryurek et al. ............ 702/104 | 2006/0075009 | A1 | 4/2006 | Lenz et al. ............ 708/160 |
| 6,597,997 | B2 | 7/2003 | Tingley .................. 702/34 | 2006/0277000 | A1 | 12/2006 | Wehrs ..................... 702/183 |
| 6,601,005 | B1 | 7/2003 | Eryurek et al. ............ 702/104 | 2007/0010968 | A1 | 1/2007 | Longsdorf et al. ............ 702/183 |
| 6,611,775 | B1 | 8/2003 | Coursolle et al. ............ 702/65 | | | | |
| 6,615,149 | B1 | 9/2003 | Wehrs ..................... 702/76 | | | | |
| 6,637,267 | B2 * | 10/2003 | Fiebelkorn et al. ............ 73/587 | | | | |
| 6,650,280 | B2 | 11/2003 | Arndt et al. ............ 342/124 | | | | |
| 6,654,697 | B1 | 11/2003 | Eryurek et al. ............ 702/47 | | | | |
| 6,662,120 | B2 | 12/2003 | Drahm et al. ........... 73/861.355 | | | | |
| 6,701,274 | B1 | 3/2004 | Eryurek et al. ............ 702/140 | | | | |
| 6,711,958 | B2 | 3/2004 | Bitto et al. ............ 73/861.355 | | | | |
| 6,722,185 | B2 * | 4/2004 | Lawson et al. ............ 73/40 | | | | |
| 6,727,812 | B2 | 4/2004 | Sauler et al. ............ 340/511 | | | | |
| 6,738,388 | B1 | 5/2004 | Stevenson et al. ............ 370/465 | | | | |
| 6,751,560 | B1 | 6/2004 | Tingley et al. ............ 702/51 | | | | |
| 6,754,601 | B1 | 6/2004 | Eryurek et al. ............ 702/104 | | | | |
| 6,757,665 | B1 | 6/2004 | Unsworth et al. ............ 706/14 | | | | |
| 6,758,168 | B2 | 7/2004 | Koskinen et al. ............ 122/7 | | | | |
| 6,859,755 | B2 | 2/2005 | Peluso et al. ............ 702/183 | | | | |
| 6,880,403 | B1 | 4/2005 | Shimada et al. ............ 73/652 | | | | |
| 6,904,476 | B2 | 6/2005 | Hedtke .................. 710/72 | | | | |
| 6,907,383 | B2 | 6/2005 | Eryurek et al. ............ 702/183 | | | | |
| 6,915,364 | B1 | 7/2005 | Christensen et al. ........... 710/104 | | | | |
| 6,920,789 | B2 | 7/2005 | Sakai .................... 73/587 | | | | |

FOREIGN PATENT DOCUMENTS

| | | |
|---|---|---|
| CN | 1185841 | 6/1998 |
| DE | 32 13 866 A1 | 10/1983 |
| DE | 35 03 597 | 7/1986 |
| DE | 35 03 597 C1 | 7/1986 |
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 199 05 071 | 8/2000 |
| DE | 19905071 A1 | 8/2000 |
| DE | 299 17 651 U1 | 12/2000 |
| DE | 199 47 129 | 4/2001 |
| DE | 100 36 971 A1 | 2/2002 |
| DE | 102 23 725 A1 | 4/2003 |
| EP | 0 122 622 A1 | 10/1984 |

| | | |
|---|---|---|
| EP | 0 413 814 A1 | 2/1991 |
| EP | 0 487 419 A2 | 5/1992 |
| EP | 0 512 794 A2 | 11/1992 |
| EP | 0 594 227 A1 | 4/1994 |
| EP | 0 624 847 A1 | 11/1994 |
| EP | 0 644 470 A2 | 3/1995 |
| EP | 0 697 586 A2 | 2/1996 |
| EP | 0 749 057 A1 | 12/1996 |
| EP | 0 825 506 A2 | 7/1997 |
| EP | 0 827 096 A2 | 9/1997 |
| EP | 0 838 768 A2 | 9/1997 |
| EP | 1 022 626 A2 | 10/1997 |
| EP | 0 807 804 A2 | 11/1997 |
| EP | 0 827 096 | 3/1998 |
| EP | 1 058 093 A1 | 5/1999 |
| EP | 0 335 957 B1 | 11/1999 |
| EP | 1 022 626 A2 | 7/2000 |
| FR | 2 302 514 | 9/1976 |
| FR | 2 334 827 | 7/1977 |
| GB | 928704 | 6/1963 |
| GB | 1 534 280 | 11/1978 |
| GB | 1 534 288 | 11/1978 |
| GB | 2 310 346 A | 8/1997 |
| GB | 2 317 969 | 4/1998 |
| GB | 2 342 453 A | 4/2000 |
| GB | 2 347 232 A | 8/2000 |
| JP | 56-031573 | 3/1981 |
| JP | 57196619 | 2/1982 |
| JP | 58-129316 | 8/1983 |
| JP | 59-116811 | 7/1984 |
| JP | 59-163520 | 9/1984 |
| JP | 59-176643 | 10/1984 |
| JP | 59-211196 | 11/1984 |
| JP | 59-211896 | 11/1984 |
| JP | 60-000507 | 1/1985 |
| JP | 60-76619 | 5/1985 |
| JP | 60-131495 | 7/1985 |
| JP | 60-174915 | 9/1985 |
| JP | 62-30915 | 2/1987 |
| JP | 62-080535 | 4/1987 |
| JP | 62-50901 | 9/1987 |
| JP | 63-169532 | 7/1988 |
| JP | 64-01914 | 1/1989 |
| JP | 64-72699 | 3/1989 |
| JP | 11-87430 | 7/1989 |
| JP | 2-05105 | 1/1990 |
| JP | 3-118424 | 5/1991 |
| JP | 3-229124 | 10/1991 |
| JP | 4-70906 | 3/1992 |
| JP | 5-122768 | 5/1993 |
| JP | 6-95882 | 4/1994 |
| JP | 06242192 | 9/1994 |
| JP | 06-248224 | 10/1994 |
| JP | 7-063586 | 3/1995 |
| JP | 07234988 | 9/1995 |
| JP | 8-054923 | 2/1996 |
| JP | 8-102241 | 4/1996 |
| JP | 8-136386 | 5/1996 |
| JP | 8-166309 | 6/1996 |
| JP | 8-247076 | 9/1996 |
| JP | 8-313466 | 11/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11-083575 | 3/1999 |
| RU | 2190267 C2 | 9/2002 |
| WO | WO 94/25933 | 11/1994 |
| WO | WO 95/23361 | 8/1995 |
| WO | WO 96/11389 | 4/1996 |
| WO | WO 08-114638 | 5/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/39718 | 9/1998 |
| WO | WO 99/19782 | 4/1999 |
| WO | WO 00/41050 | 7/2000 |
| WO | WO 00/50851 | 8/2000 |
| WO | WO 00/55700 | 9/2000 |
| WO | WO 00/70531 | 11/2000 |
| WO | WO 01/01213 A1 | 1/2001 |
| WO | WO 01/19440 | 3/2001 |
| WO | WO 01/77766 | 10/2001 |
| WO | WO 01/90704 A2 | 11/2001 |
| WO | WO 02/27418 | 4/2002 |
| WO | WO 03/081002 | 10/2003 |

OTHER PUBLICATIONS

The Second Office Action for related Chinese application No. 200680036037.3 issuing date May 20, 2010, 8 pages.
U.S. Appl. No. 09/257,896, filed Feb. 25, 1999, Eryurek et al.
"A TCP\IP Tutorial" by, Socolofsky et al., Spider Systems Limited, Jan. 1991 pp. 1-23.
"Approval Standards for Explosionproof Electrical Equipment General Requirements", Factory Mutual Research, Cl. No. 3615, Mar. 1989, pp. 1-34.
"Approval Standard Intrinsically Safe Apparatus and Associated Apparatus For Use in Class I, II, and III, Division 1 Hazardous (Classified) Locations", Factory Mutual Research, Cl. No. 3610, Oct. 1988, pp. 1-70.
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"Ethernet emerges as viable, inexpensive fieldbus", Paul G. Schreier, Personal Engineering, Dec. 1997, p. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50.02-1992, pp. 1-93.
"Fieldbus Standard for Use in Industrial Control Systems Part 3: Data Link Service Definition", ISA-S50.02-1997, Part 3, Aug. 1997, pp. 1-159.
Fieldbus Standard for Use in Industrial Control Systems Part 4: Data Link Protocol Specification, ISA-S50.02-1997, Part 4, Aug. 1997, pp. 1-481.
"Fieldbus Support For Process Analysis" by, Blevins et al., Fisher-Rosemount Systems, Inc., 1995, pp. 121-128.
"Fieldbus Technical Overview Understanding Foundation™ fieldbus technology", Fisher-Rosemount, 1998, pp. 1-23.
"Hypertext Transfer Protocol—HTTP/1.0" by, Berners-Lee et al., MIT/LCS, May 1996, pp. 1-54.
"Infranets, Intranets, and the Internet" by, Pradip Madan, Echelon Corp, Sensors, Mar. 1997, pp. 46-50.
"Internet Protocol Darpa Internet Program Protocol Specification" by, Information Sciences Institute, University of Southern California, RFC 791, Sep. 1981, pp. 1-43.
"Introduction to Emit", emWare, Inc., 1997, pp. 1-22.
"Introduction to the Internet Protocols" by, Charles L. Hedrick, Computer Science Facilities Group, Rutgers University, Oct. 3, 1988, pp. 1-97.
"Is There A Future for Ethernet in Industrial Control?", Miclot et al., Plant Engineering, Oct. 1988, pp. 44-46, 48, 50.
LFM/SIMA Internet Remote Diagnostics Research Project Summary Report, Stanford University, Jan. 23, 1997, pp. 1-6.
"Managing Devices with the Web" by, Howard et al., Byte, Sep. 1997, pp. 45-64.
"PC Software Gets Its Edge From Windows, Components, and the Internet", Wayne Labs, I&CS, Mar. 1997, pp. 23-32.
Proceedings Sensor Expo, Aneheim, California, Produced by Expocon Managemnet Associates, Inc., Apr. 1996, pp. 9-21.
Proceedings Sensor Expo, Boston, Massachuttes, Produced by Expocon Management Associates, Inc., May 1997, pp. 1-416.
"Smart Sensor Network of the Future" by, Jay Warrior, Sensors, Mar. 1997, pp. 40-45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1-69.

"On-Line Statistical Process Control for a Glass Tank Ingredient Scale," by 38 R.A. Weisman, *IFAC real Time Programming*, 1985, pp. 29-38.

"The Performance of Control Charts for Monitoring Process Variation," by C. Lowry et al., *Commun. Statis.—Simula.*, 1995, pp. 409-437.

"A Knowledge-Based Approach for Detection and Diagnosis of Out-Of-Control Events in Manufacturing Processes," by P. Love et al., *IEEE*, 1989, pp. 736-741.

"Advanced Engine Diagnostics Using Universal Process Modeling", by P. O'Sullivan, *Presented at the 1996 SAE Conference on Future Transportation Technology*, pp. 1-9.

"Programmable Hardware Architectures for Sensor Validation", by M.P. Henry et al., *Control Eng. Practice*, vol. 4, No. 10., pp. 1339-1354, (1996).

"Sensor Validation for Power Plants Using Adaptive Backpropagation Neural Network," *IEEE Transactons on Nuclear Science*, vol. 37, No. 2, by E. Eryurek et al. Apr. 1990, pp. 1040-1047.

"Smart Temperature Measurement in the '90s", by T. Kerlin et al., *C&I*, (1990).

"Software-Based Fault-Tolerant Control Design for Improved Power Plant Operation," *IEEE/IFAC Joint Symposium on Computer-Aided Control System Design*, Mar. 7-9, 1994 pp. 585-590.

A Standard Interface for Self-Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Application of Neural Networks for Sensor Validation and Plant Monitoring," by B. Upadhyaya et al., *Nuclear Technology*, vol. 97, No. 2, Feb. 1992 pp. 170-176.

"Automated Generation of Nonlinear System Characterization for Sensor Failure Detection," by B.R. Upadhyaya et al., ISA, 1989 pp. 269-274.

"In Situ Calibration of Nuclear Plant Platinum Resistance Thermometers Using Johnson Noise Methods," *EPRI*, Jun. 1983.

"Johnson Noise Thermometer for High Radiation and High-Temperature Environments," by L. Oakes et al., *Fifth Symposium on Space Nuclear Power Systems*, Jan. 1988, pp. 2-23.

"Development of a Resistance Thermometer For Use Up to 1600° C", by M.J. de Groot et al., *CAL LAB*, Jul./Aug. 1996, pp. 38-41.

"Survey, Applications, And Prospects of Johnson Noise Thermometry," T. Blalock et al., *Electrical Engineering Department*, 1981 pp. 2-11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249-1259.

"Field-based Architecture is Based on Open Systems, Improves Plant Performance", by P. Cleaveland, *I&CS*, Aug. 1996, pp. 73-74.

"Tuned-Circuit Dual-Mode Johnson Noise Thermometers," by R.L. Shepard et al., Apr. 1992.

"Tuned-Circuit Johnson Noise Thermometry," by Michael Roberts et al., *7th Symposium on Space Nuclear Power Systems*, Jan. 1990.

"Smart Field Devices Provide New Process Data, Increase System Flexibility," by Mark Boland, *I&CS*, Nov. 1994, pp. 45-51.

"Wavelet Analysis of Vibration, Part I: Theory[1]," by D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibration and Acoustics*, vol. 116, Oct. 1994, pp. 417-425.

"Development of a Long-Life, High-Reliability Remotely Operated Johnson Noise Thermometer," by R.L. Shepard et al., *ISA*, 1992, pp. 77-84.

"Application of Johnson Noise Thermometry to Space Nuclear Reactors," by M.J. Roberts et al., *Presented at the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pgs. 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp. 1605-1608.

"Development and Application of Neural Network Algorithms For Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).

"Fuzzy Logic and Neural Network Applications to Fault Diagnosis", by P. Frank et al., *International Journal of Approximate Reasoning*, (1997), pp. 68-88.

"Keynote Paper: Hardware Compilation-A New Technique for Rapid Prototyping of Digital Systems-Applied to Sensor Validation", by M.P. Henry, *Control Eng. Practice*, vol. 3, No. 7., pp. 907-924, (1995).

"The Implications of Digital Communications on Sensor Validation", by M. Henry et al., *Report No. QUEL 1912/92*, (1992).

"In-Situ Response Time Testing of Thermocouples", *ISA*, by H.M. Hashemian et al., Paper No. 89-0056, pp. 587-593, (1989).

"An Integrated Architecture For Signal Validation in Power Plants," by B.R. Upadhyaya et al., *Third IEEE International Symposium on Intelligent Control*, Aug. 24-26, 1988, pp. 1-6.

"Integration of Multiple Signal Validation Modules for Sensor Monitoring," by B. Upadhyaya et al., *Department of Nuclear Engineering*, Jul. 8, 1990, pp. 1-6.

"Intelligent Behaviour for Self-Validating Sensors", by M.P. Henry, *Advances in Measurement*, pp. 1-7, (May 1990).

"Measurement of the Temperature Fluctuation in a Resistor Generating I/F Fluctuation," by S. Hashiguchi, *Japanese Journal of Applied Physics*, vol. 22, No. 5, Part 2, May 1983, pp. L284-L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151-162.

"Thermocouple Continuity Checker," *IBM Technical Disclosure Bulletin*, vol. 20, No. 5, pp. 1954 (Oct. 1977).

"A Self-Validating Thermocouple," Janice C-Y et al., *IEEE Transactions on Control Systems Technology*, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases EMIT 3.0, Allowing Manufacturers to Internet and Network Enable Devices Royalty Free," 3 pages PR Newswire (Nov. 4, 1998).

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6[Th], WWW Conference Workshop on Embedded Web Technology, Santa Clara, CA (Apr. 7, 1997).

"Internal Statistical Quality Control for Quality Monitoring Instruments", by P. Girling et al., *ISA*, 15 pgs., 1999.

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).
"Caviation in Pumps, Pipes and Valves," *Process Engineering*, by Dr. Ronald Young, pp. 47 and 49 (Jan. 1990).
"Quantification of Heart Valve Cavitation Based on High Fidelity Pressure Measurements," *Advances in Bioengineering 1994*, by Laura A. Garrison et al., BED-vol. 28, pp. 297-298 (Nov. 6-11, 1994).
"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).
"Developing Predictive Models for Cavitation Erosion," *Codes and Standards in A Global Environment*, PVP-vol. 259, pp. 189-192(1993).
"Self-Diagnosing Intelligent Motors: A Key Enabler for Next Generation Manufacturing System," by Fred M. Discenzo et al., pp. 3/1-3/4 (1999).
"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).
"Experience in Using Estelle for the Specification and Verification of a Fieldbus Protocol: FIP," by Barretto et al., Computer Networking, pp. 295-304 (1990).
"Computer Simulation of H1 Field Bus Transmission," by Utsumi et al., Advances in Instrumentation and Control, vol. 46, Part 2, pp. 1815-1827 (1991).
"Progress in Fieldbus Developments for Measuring and Control Application," by A. Schwaier, Sensor and Acuators, pp. 115-119 (1991).
"Ein Emulationssystem zur Leistungsanalyse von Feldbussystemen, Teil 1," by R. Hoyer, pp. 335-336 (1991).
"Simulatore Integrato: Controllo su bus di campo," by Barabino et al., Automazione e Strumentazione, pp. 85-91 (Oct. 1993).
"Ein Modulares, verteiltes Diagnose-Expertensystem für die Fehlerdiagnose in lokalen Netzen," by Jürgen M. Schröder, pp. 557-565 (1990).
"Fault Diagnosis of Fieldbus Systems," by Jürgen Quade, pp. 577-581 (Oct. 1992).
"Ziele and Anwendungen von Feldbussystemen," by T. Pfeifer et al., pp. 549-557 (Oct. 1987).
"PROFIBUS Infrastructure Measures," by Tilo Pfeifer et al., pp. 416-419 (Aug. 1991).
"Simulation the Time Behaviour of Fieldbus Systems," by O. Schnelle, pp. 440-442 (1991).
"Field Bus Networks for Automation Systems Containing Intelligent Functional Unites," by W. Kriesel et al., pp. 486-489 (1987).
"Field Buses for Process Interconnection with Digital Control Systems," Tecnología, pp. 141-147 (1990).
"Decentralised Systems with Real-Time Field Bus," Netzwerke, Jg. Nr.3 v. 14.3, 4 pages (1990).
"Process Measurement and Analysis," by Liptak et al., Instrument Engineers' Handbook, Third Edition, pp. 528-530, (1995).
"Improving Dynamic Performance of Temperature Sensors With Fuzzy Control Techniques," by Wang Lei et al., pp. 872-873 (1992).
"Microsoft Press Computer Dictionary" 2nd Edition, 1994, Microsoft Press. p. 156.
International Search Report from Application No. PCT/US01/40791 with international filing date of May 22, 2001.
International Search Report from Application No. PCT/US01/40782 with international filing date of May 22, 2001.
International Search Report from Applicatioin No. PCT/02/14560 with international filing date of May 8, 2002.
International Search Report from Application No. PCT/US02/14934 with international filing date of May 8, 2002.
"On-Line Tool Condition Monitoring System With Wavelet Fuzzy Neural Network," by Li Xiaoli et al., pp. 271-276 (1997).
"Optimal Design of the Coils of an Electromagnetic Flow Meter," by Michalski, A. et al., IEEE Transactions on Magnetics, vol. 34, Issue 5, Part 1, pp. 2563-2566 (1998).
"Magnetic Fluid Flow Meter for Gases," Popa, N. C., IEEE Transactions on Magnetics, vol. 30, Issue 2, Part 1-2, pp. 936-938 (1993).
"New Approach to A Main Error Estimation for Primary Transducer of Electromagnetic Flow Meter," by Michalski, A., IEEE Instrumentation and Measurement Technology Conference Proceedings, vol. 2, pp. 1093-1097 (1998).
"Additional Information From Flowmeters Via Signal Analysis," by Amadi-Echendu, J.E. et al , IEEE Instrumentation and Measurement Technology Conference Record, vol. 7, pp. 187-193 (1990).
International Search Report from Application No. PCT/US02/06606 with international filing date of Mar. 5, 2002.
International Search Report from Application No. PCT/US02/30465 with international filing date of Sep. 25, 2002.
"What is a weighted moving average?", *Dau Stat Refresher*, http://cne,gmu.edu/modules/dau/stat/mvavgs/wma bdy.html. (1995).
U.S. Appl. No. 10/675,014, filed Sep. 2003, Longsdorf et al.
U.S. Appl. No. 10/744,809, filed Dec. 2003, Brown et al.
"Statistics Glossary: Time Series Data", by Easton et al., http://www.stats.gla.ac.uk/steps/glossary/time_series.html, Sep. 1997.
"The Indicators Story", Sustainable Seattle, pp. 55-59, 1998.
"Detecting Regimes in Temperature Time Series", by Clemins et al., *Artificial Neural Networks in Engineering, Proceedings*, pp. 727-732, 2001.
"Re: Digital Filter-Moving Average", The Math Forumn, http://mathforum.org/discuss/sci.math/a/t/177212, Sep. 28, 1998.
U.S. Appl. No. 10/893,144, filed Jul. 2004, Brown et al.
"Notification of Transmittal of the International Search Report and the Written Opinion of the International Searching Authority", or the Declaration for PCT/US2004/017300.
"Invitation to Pay Additional Fees" for PCT/US2004/031678.
"Notification of Transmittal of the International Search Report or the Declaration", PCT/US2004/025291.
"Notification of Transmittal of the International Search Report or the Declaration", PCT/US2004/031678.
"Notification of Transmittal of the International Search Report or the Declaration", PCT/US2005/011385.
"Notification of Transmittal of the International Preliminary Report on Patenatability", PCT/US2004/031678.
"Notification of Transmittal of International Search Report and the Written Opinion", PCT/US2004/022736.
"Notification of Transmittal of the International Search Report", PCT/US00/14798.
"Notification of Transmittal of International Search Report and the Written Opinion", PCT/US2006/037535.
"Notification of Transmittal of International Search Report and the Written Opinion", PCT/US2007/012317.
Invitation to Pay Additional Fee and Partial Search Report for PCT/US2007/011428, dated Oct. 8, 2008.
"Invitation to Pay Additional Fees" PCT/US2004/031678.
"Notification of Transmittal of the International Search Report and the Written Opinion" PCT/US2004/022736.
"Notification of Transmittal of the International Search Report" PCT/US00/14798.
"First Office Action" from related U.S. Appl. No. 11/439,095, Feb. 2008.
"Second Office Action" from related U.S. Appl. No. 11/439,095., Dec. 2008.
Eryurek et al., "Advanced Diagnostics Achieved with Intelligent Sensors and Fieldbus", 2001, Measurement and Control vol. 34, pp. 293-311.
Communication from European patent application No. 07838659.6 dated Jun. 24, 2010.
"A Supervision Support System for Industrial Processes" by J. Penalva et al., EIII, Oct. 1993, pp. 57-65.
"International Search Report" for related Application No. PCT/US2007/017301.
"Written Opinion" for related Application No. PCT/US2007/017301.
Invitation to Pay Additional Fee and Partial Search Report for PCT/US2007/011428, dated Oct. 8, 2008.
Third Office Action for related Chinese Patent Application No. 200680036037.3; date Jan. 19, 2011, faxed Jan. 27, 2011; 5 pages.

\* cited by examiner

LEAK DETECTOR FOR PROCESS VALVE

CROSS-REFERENCE TO RELATED APPLICATION

This Application is a Section 371 National Stage Application of International Application No. PCT/CN2006/037535, filed Sep. 26, 2006, published in English on Apr. 12, 2007, which claims priority to U.S. patent application Ser. No. 11/238,674, filed Sep. 29, 2005 now abandoned, the contents of each are hereby incorporated by reference in their entirety.

BACKGROUND OF THE INVENTION

The present invention relates to valves in industrial processes, and more particularly, to detection and diagnosis of fluid leaks through closed valves.

In the process control industry, automated control valves are used extensively to control process fluid mass flow and/or velocity in industrial processes. In some instances, especially in batch processes, it is necessary that a valve achieve a tight shut-off condition when it is closed. The phrase "tight shut-off" refers to a valve position wherein zero or near-zero fluid flows through the valve. In particular, a tight shut-off condition exists where no fluid flows through the valve, or where fluid flow is reduced to such a level that the flowing fluid had negligible impact the process.

In industrial process where a tight valve shut-off condition is required, if the valve does not shut-off tightly, the resulting material leakage into a batch recipe can ruin the batch. If a tight shut-off valve is leaking a noxious or toxic chemical, the leak can present a hazard for plant personnel and may result in an incident requiring involvement of the Environmental Protection Agency (EPA). Both of these outcomes can be very expensive.

Tight shut-off of a control valve is usually achieved using seals, such as elastomeric seals or Teflon® seals. For corrosive process fluids, Teflon® and other corrosion resistive materials are preferably used as the seal material. Unfortunately, seals fail for a variety of reasons, including corrosion, fouling, cavitation, physical wear and the like. Corrosion typically erodes the seal creating surface imperfections that make a tight seal difficult to achieve. Fouling refers to a material build up on the surface of the valve seat or seal, which prevents the valve from achieving a tight shut-off. Cavitation refers to a localized formation within a fluid flow of air or vapor pockets that expand explosively within the valve due to lowering of pressure within the flow (such as when the valve is adjusted from a closed to an open position). Expansion of vapor pockets within the flow can cause metal erosion and eventual valve failure. "Physical wear" refers to an instance where a seal is damaged during the valve closing process by pinching material between the valve plug and the valve seat or seal, thereby damaging the seat or seal body. Finally, debris can also interfere with the seal or valve travel in general, thereby preventing tight valve shut-off.

There is an on-going need in the process control industry for a means of detecting when a valve seal or valve positioner has failed or if a tight shut-off valve is leaking. Embodiments of the present invention provide solutions to these and other problems, and offer other advantages over the prior art.

SUMMARY OF THE INVENTION

A leak detection system is provided for detecting a leak through a closed valve disposed of an industrial process. An insertable plate is coupled to the valve in-line with the fluid flow. A sensor couples to the fluid flow. A leak detector is coupled to the sensor tap and adapted to detect a leak through the valve.

While the above-identified illustrations set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The present invention describes techniques for monitoring tight shut-off valves for leakage when the valves are in a fully closed position. Such tight shut-off valves are typically used in steam or other high-energy gas or liquid delivery systems within industrial processes.

Figure 1:
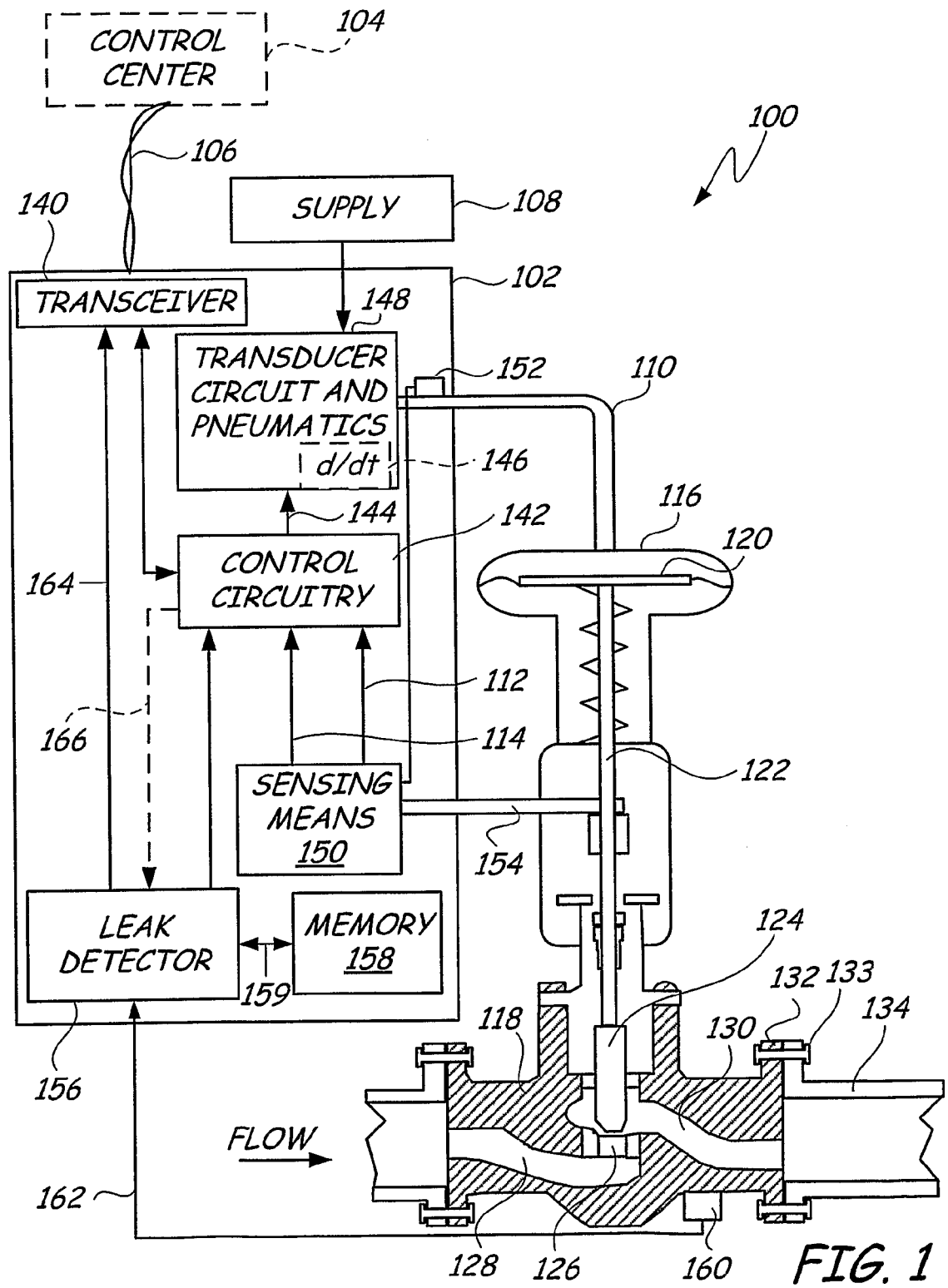
FIG. 1 is a simplified block diagram of a valve positioner with an actuator mechanically coupled to a valve and an acoustic leak detector according to an embodiment of the present invention.

FIG. 1 is a simplified block diagram of tight shut-off valve assembly 100 with a positioner/transmitter 102 adapted to open and close the valve. Generally the control room 104 transmits a desired valve position signal to valve positioner/transmitter 102 over a two-wire current loop 106. Other communications loops may also be used, including three-wire and four-wire current loops, as well as wireless communication links.

Positioner 102 receives a supply of pneumatic air 108 and provides a control pressure 110 as a function of the desired valve position set point from the control center 104 and two variables: the derivative of the control pressure signal 112 and a sensed position signal 114. Control pressure 110 provides pressurized air to actuator 116, which is mechanically connected to a linear stem control valve 118, though rotary or other types of shut-off valves are also acceptable for use with the present invention.

Actuator 116 includes a diaphragm 120, which deflects when the control pressure 110 from the pressurized air pushes against it, thereby urging the stem 122 downward. The stem 122 is coupled to valve closure element or plug 124, which is sized to mate with valve seat 126 to close the valve 118, thereby stopping fluid flow between first passageway 128 and second passageway 130 when plug 124 is fully seated. Valve 118 is coupled via flanges 132 to pipe sections 134 carrying the fluid flow, and fixed by fasteners 133.

Within positioner 102, a transceiver 140 receives a 4-20 mA signal from control center 104, but may also receive a signal from, for example, a handheld communicator, a wireless communications link, or any other communications path. The magnitude of the current on the loop is representative of the desired valve position, but digital information including sensor selection commands and data may be superimposed on the current according to a protocol such as HART®, Foundation Field Bus, CAN, or other digital protocols such as DE, BRAIN®, Infinity or Modbus®. For critical control, position signal 114 may be temperature compensated within a microprocessor.

Control circuit 142 provides a command output 144 as a function of a desired set point from transceiver 140, position signal 114, and pressure signal 112. A time derivative circuit 146 within circuit and pneumatics 148 provides a rate feedback signal (a derivative of the pressure signal 112) with respect to time for the control algorithm within circuit 146. Preferably, the pressure signal is used as a rate feedback signal, as a torque signal, or a force signal, depending on the specific implementation.

The transducer circuit and pneumatics 148 preferably uses an adaptive control algorithm, which makes use of available sensed signals such as pressure, position, force, packing and seat wear to fine tune proportional-integral-derivative control features. Generally, the transducer circuit and pneumatics 148 receives a 0-200 pounds per square inch (PSI) supply of air 108 and provides control pressure 110 as a function of the control signal 144 from control circuitry 142. Sensing means 150 senses signals from a pressure sensor 152 of control pressure 110 and a mechanical position sensor 154, and provides conditioned pressure 112 and position 114 measurements to the control circuitry 142.

A sensor 160 is coupled to valve 118 adjacent to second passageway 130 and is adapted to sense acoustic signals within the second passageway 130 caused by the fluid flowing through the valve 118. The sensed acoustic signals 162 are then processed by leak detector 156, which compares the sensed acoustic signal 162 to a stored acoustic signature 159 or template retrieved from memory 158 to determine if the valve 118 is leaking. In one embodiment, the leak detector 156 monitors the acoustic signature of the valve 118 independent of the valve position (the position of the stem 122 and plug 124). In an alternative embodiment, leak detector 156 generates a leak output 164 based on both a comparison of the sensed acoustic signal 162 with the stored signature 159 retrieved from memory 158 and a position control signal 166. In another embodiment, leak detector 156 generates a leak output signal 165 based on both a comparison of the sensed acoustic signal 162 with the stored signature 159 retrieved from memory 158 and a measured mechanical position 154.

In yet another embodiment, the leak detector 156 only compares the acoustic signal 162 with the stored acoustic signature 159 from memory 158 upon receipt of a trigger 168 either from the control center 104 or from the control circuitry 142. The resulting output 164 would then be a "blind" measurement, meaning that the output is generated without consideration of the desired or actual valve position. The output 164 can then be processed either by the control circuitry 142 or by control center 104, depending on the specific implementation.

Finally, though the various functional blocks are called out as separate elements, some of the function blocks may be combined. For example, the leak detector 156 may include the sensor 160. Specifically, the leak detector may include the sensor, a microprocessor, and a memory, as well as transmitter circuitry adapted to send and receive signals to a from a control center.

Figure 2:
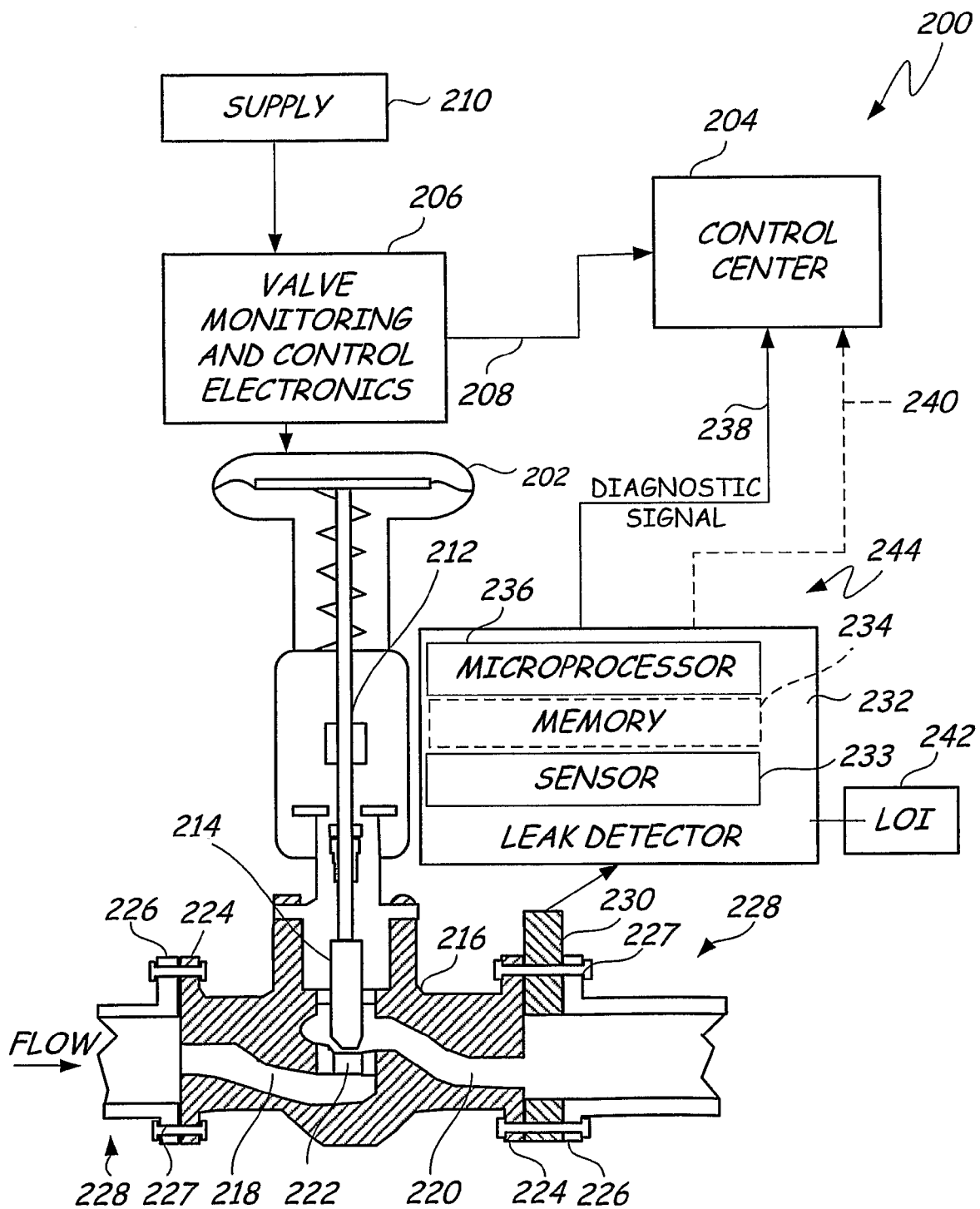
FIG. 2 is a simplified diagram of a valve with a leak detector coupled between a valve flange and a downstream pipe segment according to an embodiment of the present invention.

FIG. 2 is a simplified block diagram of a process control valve assembly 200 according to an embodiment of the present invention. Valve 202 is communicatively coupled with control center 204 through valve monitoring and control electronics 206 via communications link 208. Much of the detail provided with respect to the valve is omitted for simplicity.

As previously discussed, supply 210 provides pressurized fluid to the valve monitoring and control electronics 206, which controls the position of stem 212 and plug 214. The valve body 216 includes a first passageway 218 coupled to a second passageway 220 through valve seat 222. As the stem 212 advances downward, the plug 214 mates with valve seat 222 to halt fluid flow between the first and second passageways 218,220.

Flanges 224 couple valve 216 to flanges 226 of the adjacent pipe sections 228. A leak detection plate 230 is positioned between the valve 216 and pipe section 228 downstream from the valve 216 and in-line with the fluid flow. Fasteners 227 fix the pipe sections 228 to valve 216, and on the downstream side fasteners 227 fix the pipe section 228 to plate 230 and valve 216. Preferably, the flanges 224 are in close proximity to the valve seat 222, and optimally, one of the flanges 224 is integral to the valve body 216.

Plate 230 is provided with one or more sensor taps (shown in FIGS. 3-5) for receiving sensors, which are coupled to leak detector 232. The sensors may be acoustic sensors or pressure sensors having sufficient bandwidth to capture the target audio signal. Leak detector 232 is provided with a sensor 233, a memory 234 and a microprocessor 236 for comparing the measured downstream signal against a reference signal stored in memory 234 and for generating an output diagnostic signal 238 to the control center 204. The sensor 233 is preferably an acoustic sensor, but may be a pressure sensor or a differential pressure sensor adapted to measure process-generated signals within the desired acoustic frequency range, which may or may not fall within an audible frequency range.

For high-energy process fluids, as the valve closes (meaning plug 214 advances toward and into valve seat 222), the flow path through the valve 216 narrows, and acoustic noise is generated. This effect is sometimes noticeable with respect to a standard household faucet, which generates an audibly changing noise. Typically, acoustic noise is generated by the fluid flowing through the valve 216, and the frequency of the acoustic noise increases until it abruptly stops (or changes) when the valve 216 is fully closed (meaning that the plug 214 is fully seated in valve seat 222. It should be understood that in some instances, the acoustic noise falls within an audible frequency range. In other embodiments, the acoustic noise is at a frequency outside of an audible frequency range, but is nevertheless detectable by acoustic sensors or by pressure sensors capable of measuring the frequency range of the acoustic noise.

By evaluating the noise signal of the process flowing through the valve as detected by the acoustic sensor, it is possible to detect when a valve has not achieved a tight shut-off. If the valve 216 does not achieve a tight shut-off condition, the acoustic noise remains at an intermediate value of frequency and amplitude.

By monitoring an acoustic frequency progression (from an open valve position to closed valve position) on a process control valve 202, it is possible to determine if the valve 202 is fully shut-off or if the valve 202 is allowing process fluid to leak into the downstream pipe segment 228. Microprocessor 236 provided in leak detector 232 is used to process acoustic sensor information and to provide both a diagnostic output 238, and optionally an output 240 (shown in phantom) that is responsive to the acoustic signal picked up by the sensor, which may be indicative of, for example, a valve position. In this instance, the valve position may be inferred based on the acoustic frequency relative to a reference noise signature.

First, a reference pattern representative of the acoustic signal generated while the valve is adjusted from an open position to a fully closed (tight shut-off) condition is stored. This stored reference pattern contains frequency and amplitude sequential information that can be used as a reference template to track valve closing progress. If a frequency and amplitude pattern over time matches the template, but does not end up in a tight shut-off condition, the electronics can output an alarm or warning indicative of a leaky valve. By observing the progress of the measured signal relative to the template and noting where the end point occurred that indicated tight shut-off was not achieved, an amount of leakage (or degree of failure) can be estimated.

Detecting a leaking valve is accomplished as follows. When the valve 216 is between 80% closed and fully open, the flow noise through the valve 216 is substantially constant. However, when the valve begins to shut off (i.e. when the valve plug 214 is seated within valve seat 222 so as to close off fluid flow through the valve 216 by approximately 81% and 99%), the noise generated by the process flowing through the valve 216 begins to increase in both amplitude and frequency. Finally, as the valve 216 achieves a tight shut-off condition (i.e. the plug 214 is fully seated in the valve seat 222 such that the passageway is 100% closed), the noise signal decreases rapidly from its maximum frequency and amplitude to essentially zero.

It should be understood by workers skilled in the art that process noise is almost always present. Nevertheless, as the valve closes, the process noise as measured by the sensor changes. The microprocessor 236 is adapted to compare the measured acoustic frequency against a stored template or acoustic signature from memory 234, and can detect an acoustic change when the valve is fully shut. Leak detector 232 is adapted to separate process (background) noise from the sensed signal in order to isolate leak-related noise.

It is also possible to detect developing problems in a process based on changes in the acoustic noise signature as compared to the baseline signature stored in memory 234. In particular, changes in background noise may be indicative of problems developing in fixed equipment in the industrial process, such as bearing failure, pump failure and the like. For example, as bearings in rotatable equipment begin to fail, they often produce a squealing noise, which is an early sign of potential bearing failure. If such equipment starts generating additional process noise, that noise aggregates with the existing process noise. A significant change in process noise amplitude or the convolution of signals of frequencies outside of the normal range (and which are not represented in the stored acoustic signature) may be indicative of a developing problem with fixed process equipment.

In one embodiment, in addition to generating a diagnostic signal relating to the valve 216, microprocessor 236 is adapted to provide a predictive diagnostic signal representative of the overall health of the process equipment. This optional process equipment diagnostic signal is based on a difference between the measured background noise and the background noise of the stored reference signature. Specifically, if the measured background noise changes from a stored reference signature by more than a predetermined limit, the leak detector 232 is adapted to generate an alarm signal to the control center 204.

In general, the electronics can be co-located in a single package (such as shown in FIG. 1). Alternatively, as shown in FIG. 2, the leak detector 232 may be separate from the valve monitoring and control electronics 206.

In a preferred embodiment, the leak detector 232 provides the capability of having initial values set via an external device or via a local operator interface (LOI) 242, which can be integral to the transmitter 244 containing leak detector 232. In a preferred embodiment, the electronics support bi-directional communication via a digital bus like HART, Foundation Field Bus, CAN, or any other bi-directional communications standards. This communication capability is used for setting initial values and outputting various levels of alarm criticality. For this type of meter, the electronics are typically 4-20 mA loop powered.

Figure 3:
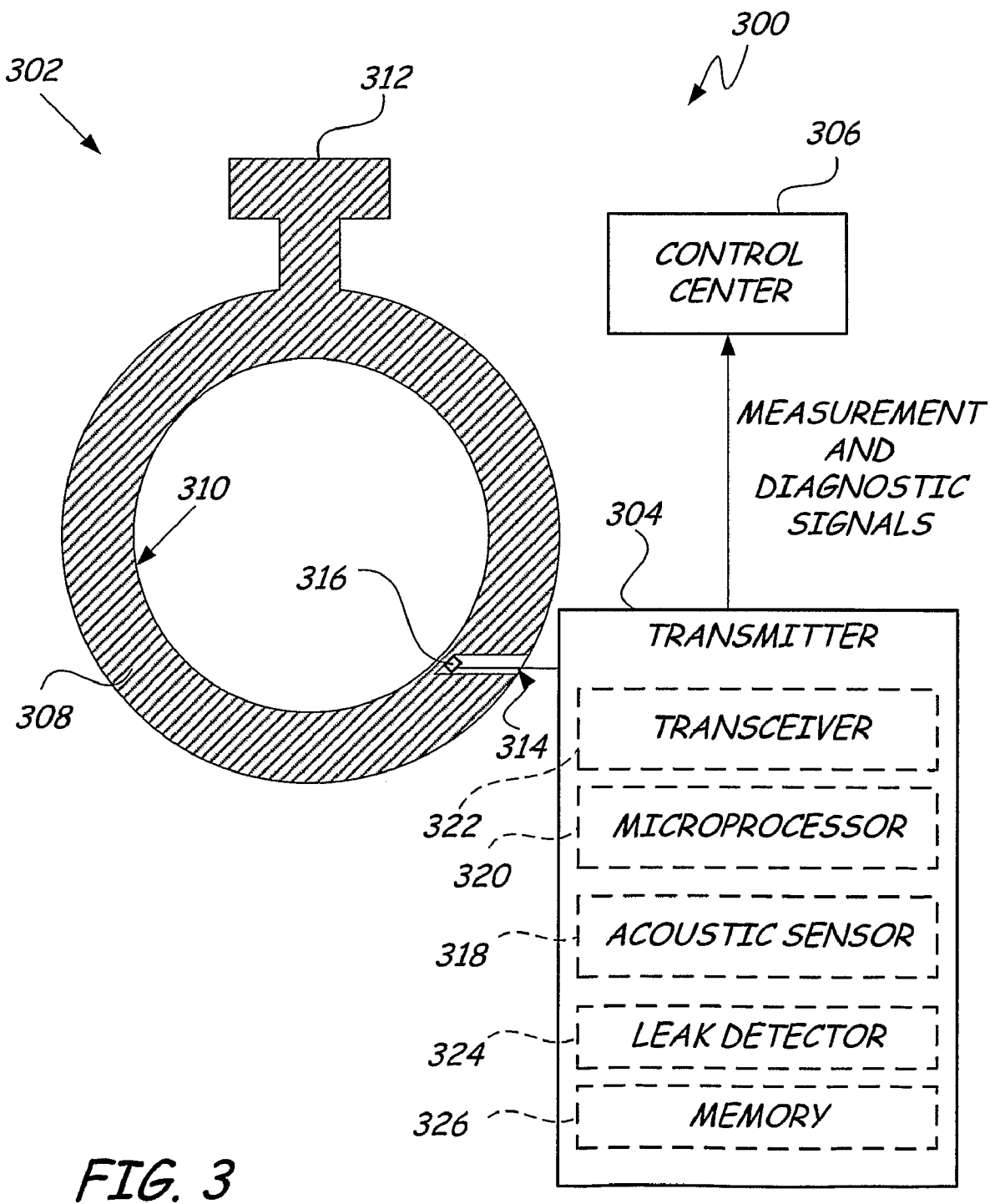
FIG. 3 is a cross-sectional view of the leak detector of FIG. 2 configured for acoustic leak detection according to an embodiment of the present invention.

FIG. 3 is a simplified cross-sectional view of an acoustic leak detector 300 including plate 302, which is adapted to host transmitter 304. The transmitter 304 is adapted to detect acoustic signals caused by fluid flowing through the valve (such as that shown in FIG. 2) and to send measurement and diagnostic signals to a control center 306.

Generally, plate 302 has a ring-shaped body 308 defining a lumen 310 sized to mate with a downstream pipe segment (such as element 228 in FIG. 2). Plate 302 is provided with extension 312 adapted to provide a visual reference to an operator in the field as well as a positioning element for positioning the plate 302 between the valve flange and the downstream pipe segment during installation. Finally, tap 314 is provided in the body 308 for receiving a sensing element 316. In general, the tap 314 extends almost an entire thickness of the wall of plate 302. In an alternative embodiment, the tap 314 extends entirely through the wall of the body 308 and into the lumen 310, and the sensing element 316 is adapted to seal the tap opening and to be in direct contact with the fluid flow during operation.

Transmitter 304 includes an acoustic sensor 318 adapted to detect an acoustic signal measured by the sensing element 316. Transmitter 304 includes a microprocessor 320 for conditioning the measured acoustic signal. Transceiver 322 is adapted to send measurement and diagnostic signals to the control center 306 and to receive control signals from the control center 306. Finally, a leak detector 324 is provided for detecting a leak through a valve based on changes in a measured acoustic signal as compared to a baseline signal stored in memory 326.

In general, all of the elements of transmitter 304 are shown in phantom, in part, because the various functions and functionality may be combined into a single circuit element or multiple circuit and/or software elements, depending on the specific implementation. In particular, each element (318 through 326) is shown only to illustrate the functional capabilities of the acoustic transmitter 304.

Figure 4A:
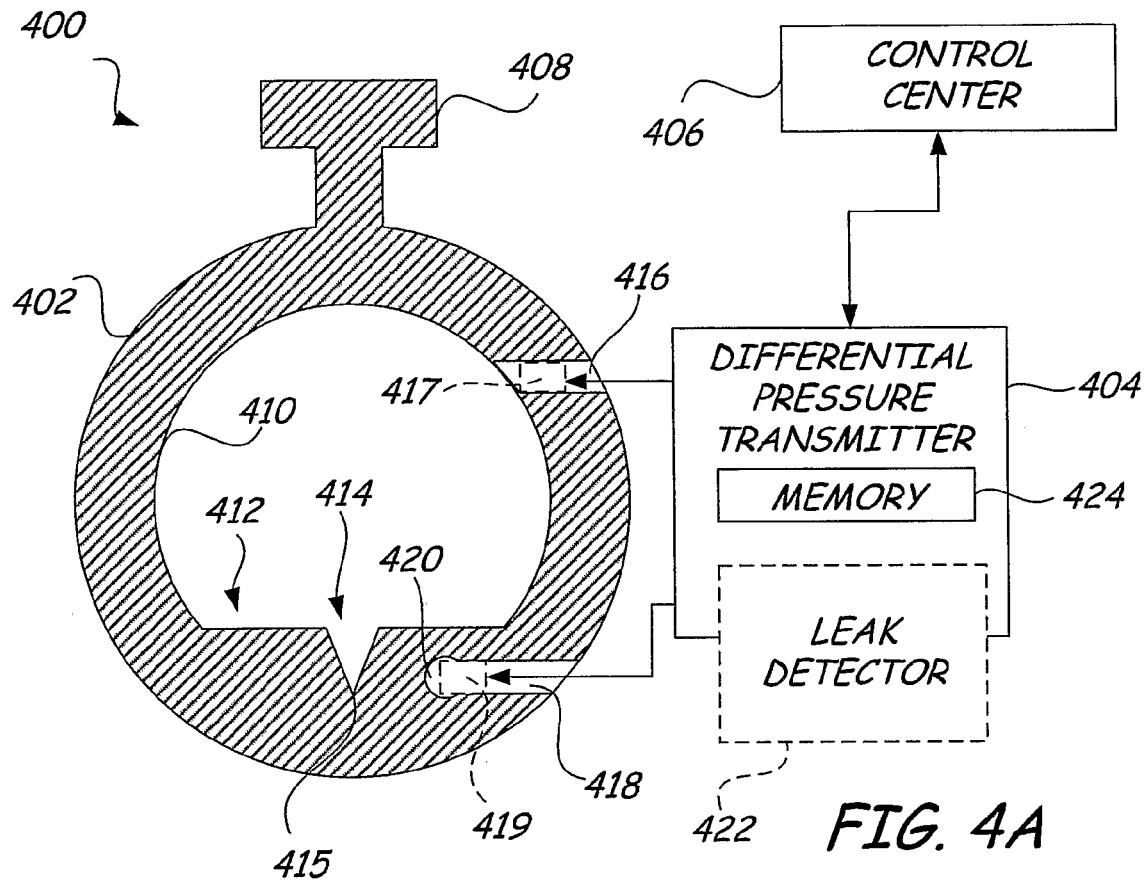
FIG. 4A is a cross-sectional view the leak detector of FIG. 2 configured for leak detection using differential pressure measurements according to an embodiment of the present invention.

FIG. 4A illustrates an alternative embodiment of the leak detector 400. Leak detector 400 includes plate 402 for coupling between the valve and the downstream pipe segment and in-line with the fluid flow. The plate 402 is coupled to a differential pressure transmitter 404, which is in turn coupled to a control center 406. Plate 402 includes an extension element 408, which can be used during installation to position and orient the plate 402. As in FIG. 3, plate 402 defines a lumen 410, which is generally sized to coupled to a chamber of a valve between the valve and a downstream pipe segment. Additionally, the lumen 410 of the plate 402 is fabricated with a flow restriction element 412 including a variable area flow region 414 that narrows to a point 415. Preferably, the plate 402 can be inserted between the tight shut-off valve and a downstream pipe segment.

The variable area flow region 414 is sized such that the head of the fluid between the valve outlet and the insertable plate 402 increases with increased leak (flow) rate. In FIG. 4A, this variable area feature 414 is exaggerated in size for clarity. In general, the v-shaped variable area 414 makes the differential pressure transmitter more sensitive to low flows. Two pressure ports 416 and 418 are provided in the wall of plate 402, and a cross-bore extends from the valve side of the plate 402 to the pressure port 418.

A differential pressure transmitter 404 couples to sensors 417 and 419 disposed within pressure ports 416 and 418 to measure a differential pressure within the lumen 410 of the plate 402 and by extension through the associated valve and downstream pipe segment. The differential pressure transmitter 404 is provided with a leak detector 422 for identifying a leak through the valve based on variations in the differential pressure as compared with a baseline differential pressure stored in a memory. Leak detector 422 is shown in phantom and overlapping differential transmitter 404 to indicate that the leak detector 422 may be contained within the differential transmitter 404 or may be separate. Additionally, the specific function of the leak detector 422 may be performed by the control center 406 based on measurement data received from the differential pressure transmitter 406.

Figure 4B:
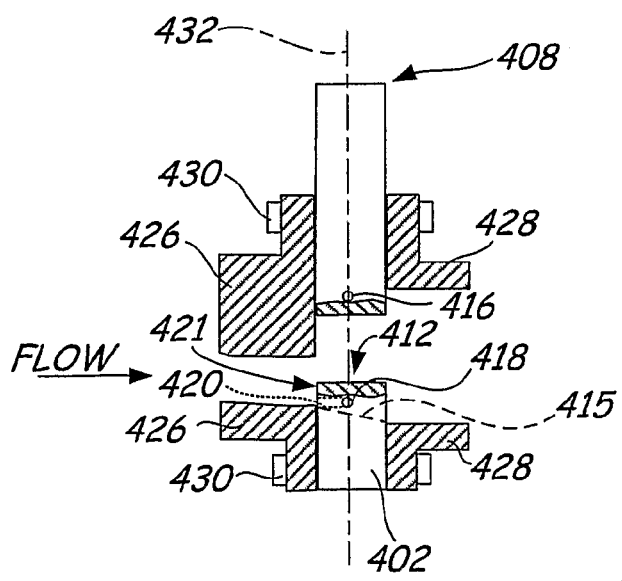
FIG. 4B is a cross-sectional side-view of an embodiment of the leak detector of FIG. 4A.

In general, pressure port 416 is positioned near the top of the lumen 410 to monitor the head of the process fluid as it flows through the flow restriction plate 402. Pressure port 418 is positioned near the bottom of the lumen 410 to measure the pipe static pressure, such that the pressure measurement is a true differential pressure. Pressure port 416 and pressure port 418 extend into the plate 402 in a direction that is substantially transverse to the direction fluid flow through the plate 402 (when the plate 402 is coupled to a valve). To measure the differential pressure, the ports 416 and 418 are preferably substantially aligned along an axis transverse to the direction of flow (as shown in FIG. 4B) The cross bore 420 extends through the plate 402 and into the port 418. As fluid builds up in the variable area 414, static pressure builds in the cross-bore 420 and is measured by the pressure sensor in pressure port 418. Though the present embodiment has been described with respect to differential pressure sensors, two gage pressure or absolute pressure sensors could also be used to make this measurement.

Detecting a leaking valve is accomplished as follows. When the valve is open, the downstream pipe is substantially full of process fluid. When the valve is shut off, the fluid in the pipe begins to drain. For the pipe full condition, both pressure ports 416 and 418 are covered by fluid. As long as this is true, the measured differential pressure remains substantially unchanged. Once the fluid level in the pipe drops below the top port 416, the transmitter 404 measures the fluid head in the pipe. If the valve tightly shuts off, the fluid head continues to decrease until the height of the fluid is the same as the height of the bottom of the variable area (channel) 414 of flow restriction 412. At this point, no additional flow occurs, and the differential pressure measurement reaches a plateau and remains substantially unchanging. The transmitter 404 measures the fluid head during tight shut-off conditions, and stores the head measurement in a memory 424 as a reference value.

If the valve is leaking after being shut off, some process fluid leaks into the area between the plate 402 and the valve. This fluid flows out over the flow restriction 412 and variable area 414 in the plate 402. The variable area 414 is shaped to readily detect changes in head for small increments of flow when the flow is near a zero-flow (or no-flow) condition. As fluid leaks past the valve seal, the differential pressure measurement changes appreciably. If the differential pressure measurement changes by more than a predetermined amount, an alarm or warning is generated by the leak detector 422 and provided on the output of transmitter 404. In this embodiment, the installation design is configured such that the downstream piping from the valve drains when the valve is shut off.

In FIG. 4B, the plate 402 is shown in situ and with partial cross-sectioning. Plate 402 preferably includes upper bore (pressure tap) 416 and lower bore (pressure tap) 418 substantially aligned along axis 432, which extends transverse to the direction of flow. The plate 402 is disposed between valve 426 and downstream pipe segment 428 and is held in place by clamping means 430.

As shown, the cross bore 420 (shown in phantom) extends from an upstream surface 421 of the plate 420 to the lower bore 418. The cross bore 420 is disposed within the flow restriction 412 and exposed to the fluid flow. Fluid leakage through a closed valve received from the valve portion 426 builds up behind the flow restriction 412 and flows through the variable area v-shaped portion of the flow restriction 412 (element 414 in FIG. 4A) along the bottom of the v-shaped area (indicated by phantom line 415). As fluid builds up behind the flow restriction 412, some of the leakage fluid flows into the cross bore 420, and a sensor disposed within the lower bore (pressure tap) 418 can be adapted to measure the static pressure within the cross-bore. A differential pressure between the static pressure measurement from the sensor in the lower bore 418 as compared with a pressure measurement by a sensor in upper bore 416 may be used to detect very small leaks through the valve.

The bottom portion 415 of the variable area flow restriction is sloped away from the valve 426 toward the downstream pipe segment 428 to encourage drainage. If the valve is tightly shut off, fluid drains away from the plate 402, and after a brief period, all fluid drains away from the flow restriction across the bottom portion 415 and into the downstream pipe segment 428. If a leak persists, fluid continues to flow into the valve portion 426, builds up behind the flow restriction 412 and flows into the cross bore 420, thereby creating a differential pressure. The leak detector 422 of FIG. 4A can be used to identify differential pressures indicative of a leak condition. If a leak is detected, a control signal may be generated to, for example, a pneumatic actuator to tighten the valve into a valve seat. Alternatively, an alarm signal may be generated to the control center (such as control center 406). In either case, the differential pressure taps 416 and 418 provide a means for detection of a leaking valve.

Figure 5:
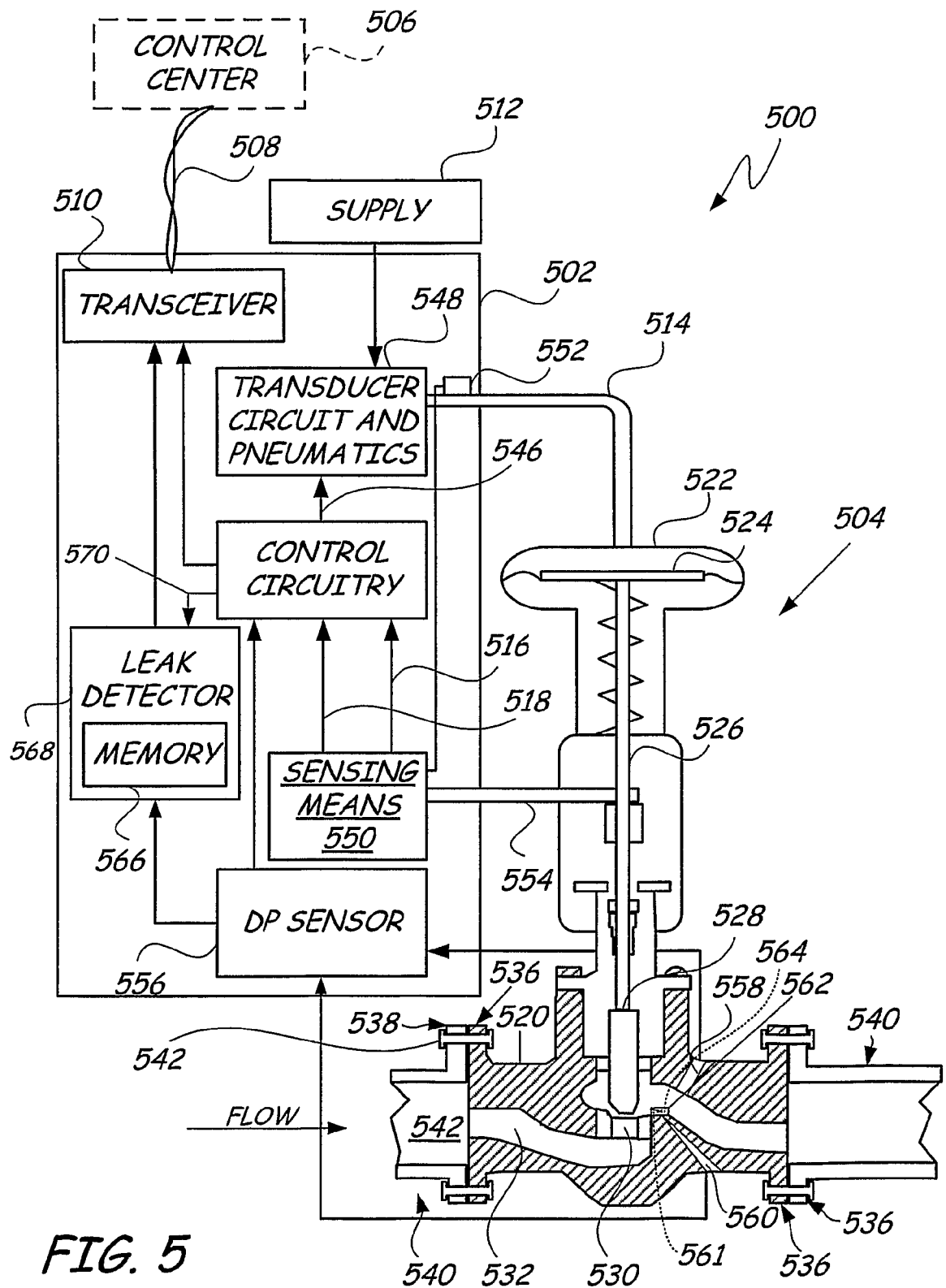
FIG. 5 is a simplified block diagram of a differential pressure-based leak detector associated with a valve having differential pressure ports according to an embodiment of the present invention.

FIG. 5 illustrates a simplified block diagram of a tight shut-off valve with a leak detection system 500 according to an alternative embodiment of the present invention. In this embodiment, the tapered flow restriction and pressure ports (or taps) of FIGS. 4A and 4B are incorporated into the valve body, eliminating the need for the separate plate.

The leak detection system 500 includes a transmitter 502 coupled to a pneumatic valve 504 and adapted to open and close the valve. Additionally, the transmitter 502 is in communication with control center 506 via communications link 508. In one embodiment, the communications link 508 is a two-wire loop; however, other communication links may be used as well, including wireless links, or three or four-wire links. Generally, the control center 506 transmits a desired valve position signal to valve positioner/transmitter 502 over a two-wire current loop 508. Other communications loops may also be used, including three-wire and four-wire current loops, as well as wireless communication links.

Positioner/transmitter 502 receives a supply of pneumatic air 512 and provides a control pressure 514 as a function of the desired valve position set point from the control center 506 and two variables: the derivative of the control pressure signal 516 and a sensed position signal 518. Control pressure 514 provides pressurized air to actuator 504, which is mechanically connected to a linear stem control valve 520, though rotary or other types of shut-off valves are also acceptable for use with the present invention.

Actuator 522 includes a diaphragm 524, which deflects when the control pressure 514 from the pressurized air pushes against it, thereby urging the stem 526 downward. The stem 526 is coupled to valve plug 528, which is sized to mate with valve seat 530 to close the valve 520, thereby stopping fluid flow between first passageway 532 and second passageway 534 when plug 528 is fully seated. Valve 520 is coupled to process pipe sections 540, which carries a fluid flow. The valve 520 is coupled to pipe sections 540 via valve flanges 536 and pipe flanges 538, which are fixed by fasteners 542.

Within positioner/transmitter 502, transceiver 510 receives a 4-20 mA signal from control center 506, but may also receive a signal from, for example, a handheld communicator, a wireless communications link, or any other communications path. The magnitude of the current on the loop is representative of the desired valve position, but digital information including sensor selection commands and data may be superimposed on the current according to a protocol such as HART®, Foundation Field Bus, CAN, or other digital protocols such as DE, BRAIN®, Infinity or Modbus®. For critical control, position signal 518 may be temperature compensated within a microprocessor.

Control circuitry 544 provides a command output 546 as a function of a desired set point from transceiver 510, position signal 518, and pressure signal 516. Transducer circuit and pneumatics 548 controls pressure 514 based on control signal 546. In one embodiment, a time derivative function (not shown) provides a rate feedback signal (a derivative of the pressure signal 516) with respect to time for the control algorithm within control circuitry 544. Preferably, the pressure signal 516 is used as a rate feedback signal, as a torque signal, or a force signal, depending on the specific implementation.

The transducer circuit and pneumatics 548 preferably uses an adaptive control algorithm, which makes use of available sensed signals such as pressure, position, force, packing and seat wear to fine tune proportional-integral-derivative control features. Generally, the transducer circuit and pneumatics 548 receives a 0-200 pounds per square inch (PSI) supply of air 512 and provides control pressure 514 as a function of the control signal 546 from control circuitry 544. Sensing means 550 senses signals from a pressure sensor 552 of control pressure 514 and a mechanical position sensor 554, and provides conditioned pressure 516 and position 518 measurements to the control circuitry 544.

A differential pressure sensor 556 is coupled to valve 520 adjacent to second passageway 534 and is adapted to sense acoustic signals within the second passageway 534 caused by the fluid flowing through the valve 520. In particular, upper pressure tap 558 (or pressure port) and lower pressure tap 560 are provided in the housing of the valve 520. A cross-bore 561 may be provided in a variable area flow restriction element 562 extending from a surface of the flow restriction element 562 facing in a direction of the valve seat 530. Fluid leaking through the valve builds up behind the flow restriction element 562, filling the cross bore 561, thereby providing a static pressure within the cross bore 561 which can be measured by a sensor within tap 560, which intersects the cross-bore 561.

In general, sensing means (not shown) may be positioned within taps 558,560 and coupled to the differential pressure sensor 556 for measuring a differential pressure within the second passageway 534. A flow restriction element 562 with a variable area 564 is fabricated within the second passageway 534 for measuring a low fluid flow through the valve 520.

As previously discussed, the upper tap 558 measures a head of the process fluid flowing within the second passageway 534. The lower tap 560 measures the static pressure of the valve 562, based on fluid within the cross-bore 561. When the valve 520 is shut off (meaning that the plug 528 is seated in valve seat 530), the fluid flow within the passageway 534 begins to drain. When both pressure taps 558,560 are covered by fluid, the measured differential pressure does not change (and the measured pressure at each port 558 and 560 is substantially the same). However, as the fluid drains below the level of the upper tap 558, the transmitter 502 measures the fluid head within the valve 520. If the valve 520 is tightly closed, the fluid head continues to decrease until the height of the fluid is zero and no additional flow occurs. At this point, the pattern associated with the differential pressure measurement plateaus. The head measurement can be stored in memory 566, and can be used by leak detector 568 to identify valve leaks if a change in the head measurement at its low point as compared to the stored head measurement exceeds a predetermined limit.

The leak detector 568 may be additionally enhanced by making use of the valve control signal 546 (indicated by arrow 570). In particular, the leak detector 568 can monitor the valve control signal 570 to verify tight shut off when a closed valve is requested by the control center 506. If the flow noise amplitude and frequency do not indicate that a tight shut-off condition has been achieved, the leak detector 568 through the transceiver 510 can transmit a diagnostic warning or alarm that the valve 520 may be leaking. Moreover, by tracking the valve control signal 546,570, the leak detector 568 can provide secondary indicia of valve position based on the sensed acoustic frequency of fluid flowing through the valve 520 as compared to an acoustic frequency profile stored in memory 566.

Figure 6A:
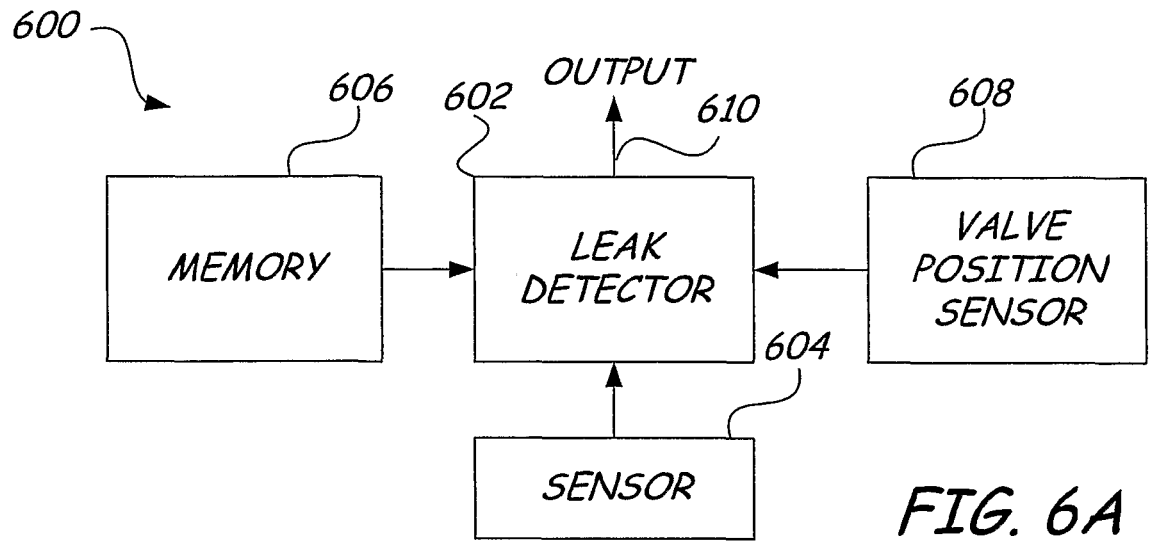
FIGS. 6A and 6B are simplified block diagrams of leak detection systems according to embodiments of the present invention.
Figure 6B:
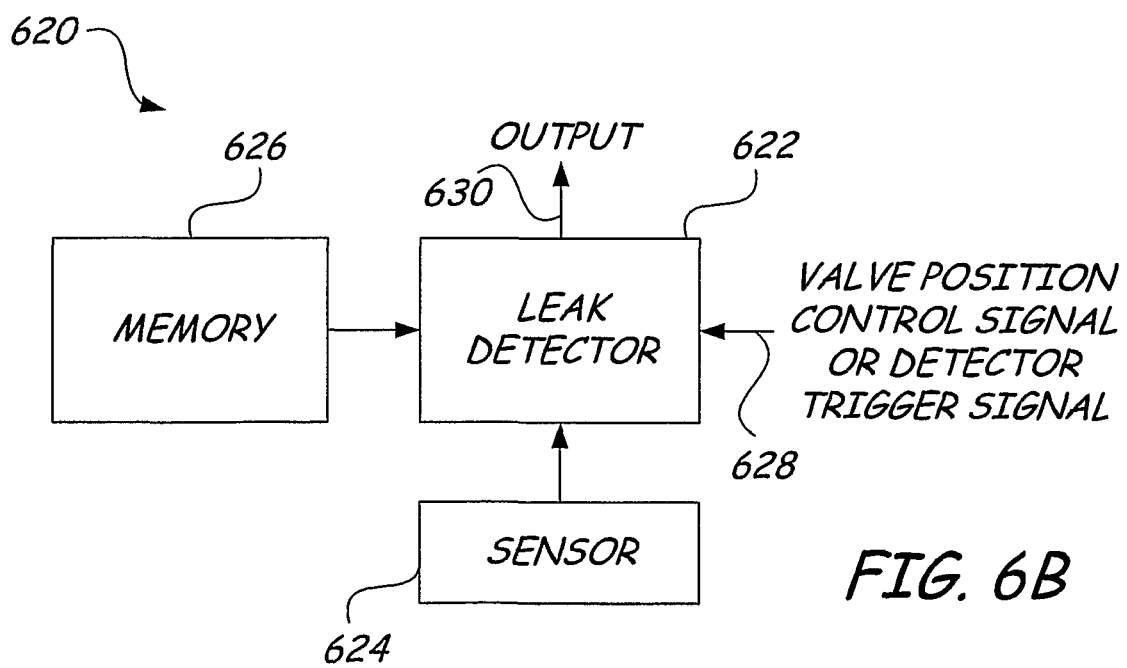

FIGS. 6A and 6B are simplified block diagrams illustrating two possible implementations of the leak detector of the present invention. In FIG. 6A, the leak detection system 600 includes a leak detector 602 coupled to a sensor 604 and a memory 606. The leak detector 602 receives a measurement signal from the sensor 604 and a valve position signal from a valve position sensor 608. The leak detector 602 compares the measurement signal from sensor 604 to a stored measurement signal from memory 606, and determines whether the valve is leaking, taking into account the valve position measurement of the valve position sensor 608. If the measurement from sensor 604 indicates fluid flow, but the valve position sensor 608 indicates the valve is open, there is no leak. On the other hand, if the valve position sensor 608 indicates a fully closed valve but sensor 604 indicates fluid flow, leak detector 602 generates an alarm 610 indicative of a leak on its output.

In general, the sensor 604 may be an acoustic sensor, a differential pressure sensor, or any other type of sensor adapted to detect low fluid flow in a downstream pipe section or in the secondary passageway of a valve.

FIG. 6B illustrates an alternative embodiment of a leak detection system 620 according to an embodiment of the present invention. The leak detection system 620 includes leak detector 622, which is coupled to sensor 624 and memory 626. The sensor 624 is coupled to an industrial process adjacent to or integral with a secondary passageway of a valve. The sensor 624 detects fluid flow within the lumen of the pipe section or valve, and the leak detector compares the measured fluid flow against a stored signature from memory 626. In a preferred embodiment, fluid flow is measured according to an acoustic signature generated by the fluid passing through the valve. The acoustic signature may or may not fall within an audible frequency range, but is nevertheless detectable by an acoustic sensor or by pressure sensors having sufficient bandwidth to capture the target acoustic signal.

The leak detector 622 utilizes a valve position control signal or detector trigger signal 628. The valve position control signal (indicating a desired valve position) is used by the leak detector 628 to provide secondary indicia of whether the desired valve position is achieved. Specifically, the valve is only partially closed, the positioning of the valve plug should cause the acoustic signature to change, and the change should correspond to an acoustic frequency of the stored reference. If the valve plug causes an acoustic frequency different from the stored reference frequency for the desired plug position, the leak detector 622 generates an output indicating that the valve may be more or less closed than desired. The extent of deviation from the stored reference frequency may provide an indication of the extent to which the valve positioner overshot or undershot the desired valve position.

Alternatively, if the signal 628 is a detector trigger signal, the controller can initiate a test by the leak detector 622. The leak detector 622, upon receipt of the trigger signal 628, polls the sensor 624 and compares the retrieved measurement signal against a stored measurement signal from memory 626. If the difference between the two signals exceeds a predetermined limit, an alarm signal can be placed on the leak detector output 630.

While the present invention has largely been described with respect to a valve having a pneumatic actuator for physically positioning the valve, other actuators such as electric, hydraulic, and the like may be used with the present invention as well. In general, the present invention is intended for tight shut-off applications, such as in the food processing industry where heat deliver (via steam) or ingredient delivery to the batch must be tightly controlled.

As used herein, the term tight shut-off refers to a condition where fluid flow through the valve is reduced to zero fluid flow or to fluid flow at such a slow rate that it has no impact on the batch process.

In an alternative embodiment, particularly for use with steam applications, the pressure or acoustic detectors can be replaced with a differential temperature transmitter. In particular, when the valve is closed, steam within the pipe will condense and flow out into the downstream pipe segment. An upper tap and lower tap would have a wide temperature differential if steam were slowly leaking through the valve. In one embodiment, the steam would quickly condenses, and the upper temperature sensor measures a much lower temperature than the lower temperature sensor. Alternatively, the steam escapes through the "closed valve" rapidly, causing the upper temperature sensor to continue to measure a high temperature, while the lower temperature sensor (positioned at the bottom of the valve) cools (after all liquid should have drained from the valve).

In general, the present invention provides an on-line method of detecting if a valve is leaking when it should be shut-off. Moreover, the variation from the frequency/amplitude template can provide an indication of the severity or extent of the leak. The present invention is also simple to implement by a user, in part, because no welding or hot tapping is required for installation. The sensor can be readily clamped to the valve body. Alternatively, an orifice plate with an associated sensor can be readily inserted between the valve and the downstream pipe section.

Additionally, the present invention provides a simple means for testing the leak detector (acoustic sensor), simply by detecting if normal flow noise is present during operation when the valve is open. A differential pressure transmitter can be used as the acoustic sensor if its frequency response is high enough. The present invention provides a low cost leak detection scheme, as compared to costs associated with installation of additional valving, piping, venting, and hardware to deal with critical valves that require tight shut-off.

In general, the electronics include circuitry and/or software adapted to receive the pressure signal and to condition the pressure signal. Additionally, the electronics includes a leak detector (or leak detection function) adapted to identify unacceptable values of leakage flow. Additionally, the electronics include a memory for storing set-up values, and, at a minimum, a digital processing capability. In a preferred embodiment, the memory is a non-volatile memory.

As a diagnostic, any plugging of the flow restriction geometry may appear as a leak condition at shut off. As part of evaluating any alarm or warning, the plate can be easily removed and checked for plugging before proceeding to determine if the valve seals need servicing. In an alternative embodiment, the tapered flow restriction and the pressure ports can be incorporated directly into the valve body, thereby eliminating the need for a separate plate.

Figure 7:
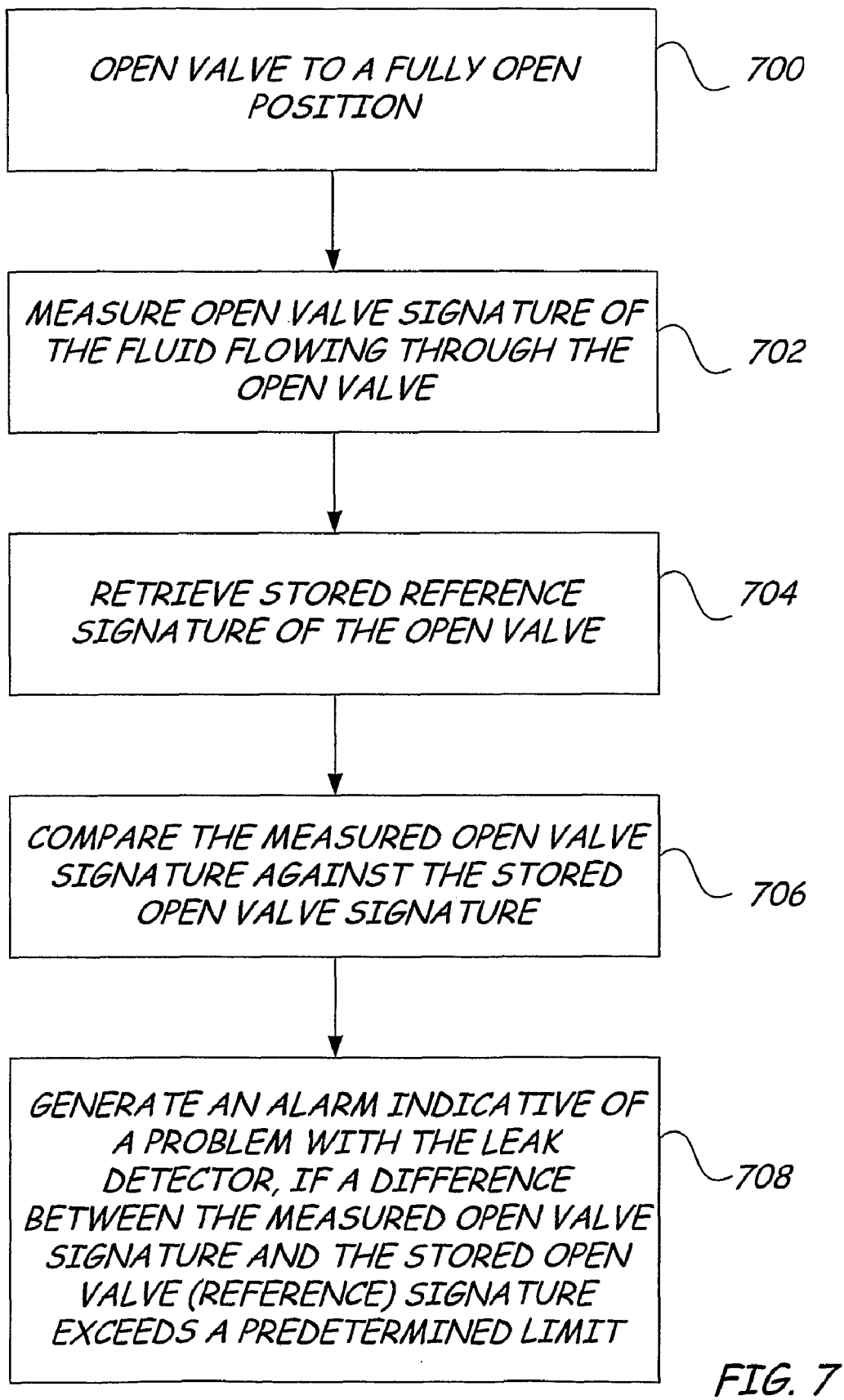
FIG. 7 is a simplified flow diagram of a method of diagnosing whether the leak detector is functioning properly according to one embodiment of the present invention.

FIG. 7 illustrates a method of diagnosing whether the leak detector is working according to an embodiment of the present invention. First, the valve is opened (step 700). The sensor detects the open valve signature of the fluid flowing through the open valve (step 702). The leak detector retrieves the stored reference signature of the open valve (step 704) and compares the measured open valve signature against the stored open valve signature (step 706). If a difference between the measured open valve signature and the stored open valve (reference) signature exceeds a predetermined limit, an alarm indicative of a problem with the leak detector is generated (step 708).

Figure 8:
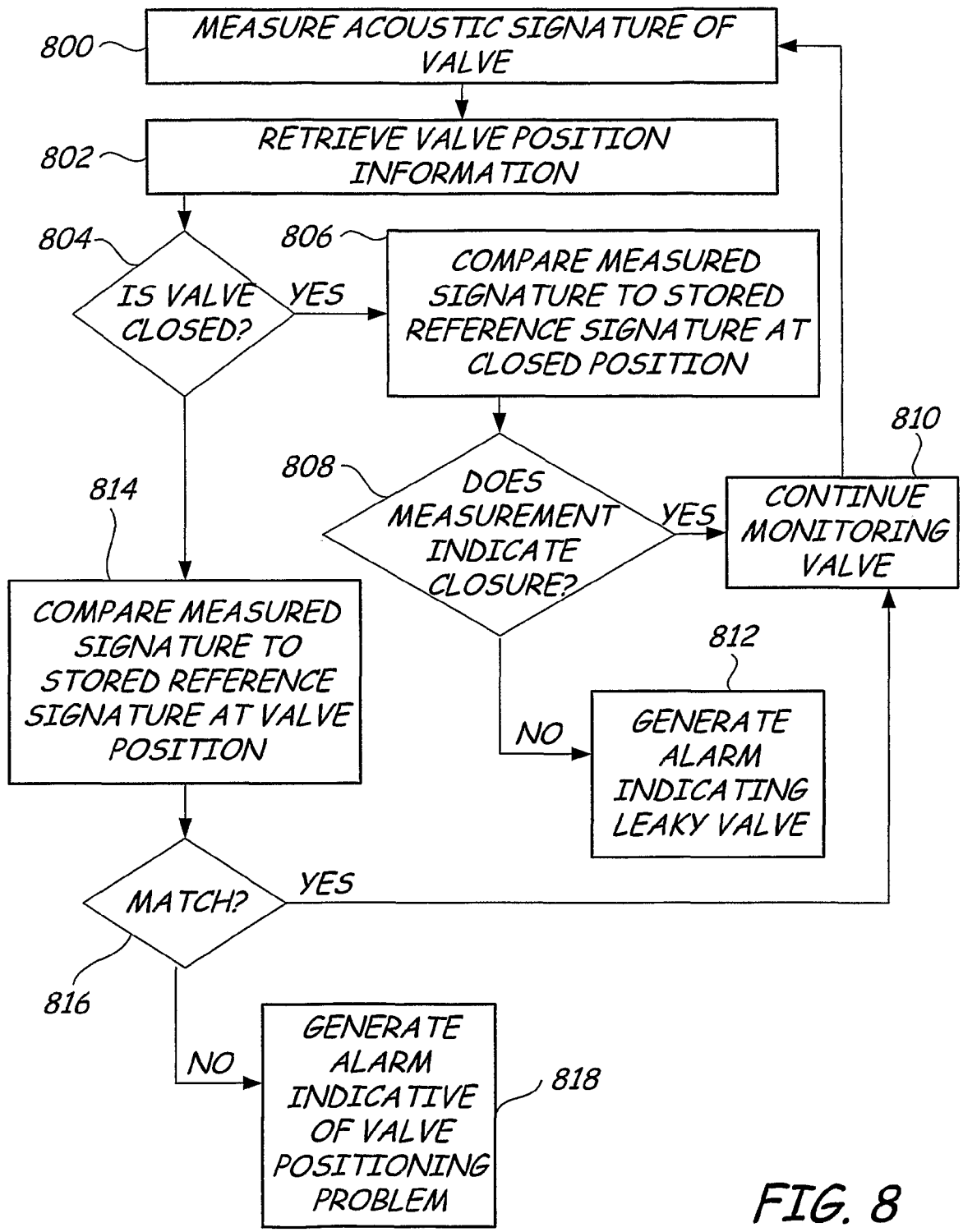
FIG. 8 is a simplified flow diagram of a method of identifying a type of valve failure based on acoustic signature and valve position information.

FIG. 8 is a simplified flow diagram of a method of diagnosing valve failure according to an embodiment of the present invention. The leak detector measures an acoustic signature of a valve (step 800). The leak detector retrieves valve position information (step 802) from, for example, a valve stem position sensor, control circuitry, or other elements adapted to monitor valve position. The leak detector tests the valve position information to see if the valve is closed (step 804). If the valve is closed, the leak detector compares the measured valve signature to a stored reference signature at the "closed" position (step 806). If the measured valve signature indicates the valve is closed (step 808), the valve is closed and the leak detector continues to monitor the valve (block 810). If the measured signature does not match the reference signature at the closed position (step 808), the valve is not shut off, and an alarm is generated indicating a leaking valve (step 812).

If the valve is not closed (step 804), the measured acoustic signature of the valve is compared to a stored reference signature at the retrieved valve position (step 814). If the measured signature matches the stored reference signature at the valve position (step 816), the leak detector continues to monitor the valve (step 810). If the measured signature does not match the stored reference signature at the valve position (step 816), the leak detector generates an alarm indicating that there is a problem with the valve positioner (step 818).

In this instance, valve position is being monitored by the positioner or controller circuitry, so the acoustic leak detector is adapted to provide leaky valve diagnostics as well as secondary confirmation of valve position. If the positioner is not functioning properly, the leak detector is unable to match the measured signal against the reference signal at the desired valve position, and a valve failure (positioner failure) alarm can be generated.

Figure 9:
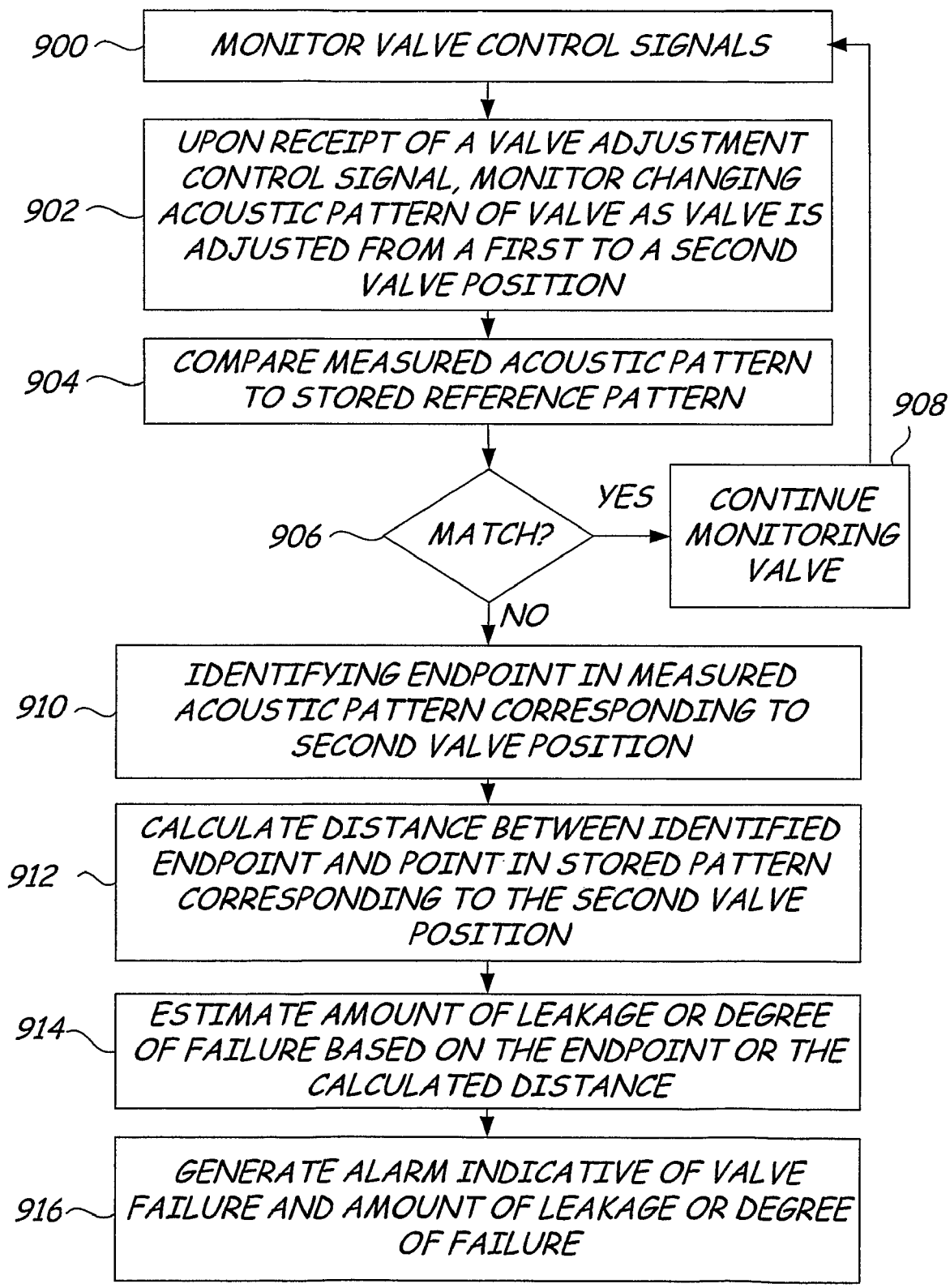
FIG. 9 is a simplified flow diagram of a method for estimating valve leakage or degree of failure based on a measured acoustic signal and valve control information.

FIG. 9 is a simplified flow diagram of a leaky valve diagnostic method for estimating leakage based on a measured acoustic signal. In general, a properly functioning valve is monitored as it is adjusted from a fully open to a fully closed position, and the acoustic pattern associated with the adjustment of the valve is stored in memory as a reference pattern. As used herein, the phrase "properly functioning" refers to a valve that achieves a tight shut-off when fully closed. During operation, the leak detector monitors the valve control signals (step 900). Upon receipt of a valve adjustment control signal, the leak detector monitors the changing acoustic pattern of the valve as the valve is adjusted from a first position to a second position (step 902). The leak detector compares the measured acoustic pattern to the stored reference pattern (step 904). If the patterns match (step 906), the valve is functioning properly and the leak detector continues monitoring the valve (step 908).

If the patterns do not match (step 906), the leak detector identifies an endpoint in the measured acoustic pattern corresponding to the second valve position (step 910). The leak detector calculates the distance between the identified endpoint and the point in the stored reference pattern corresponding to the second valve position (step 912). The distance calculation is a measure of the disparity between the identified endpoint in the measured acoustic pattern as compared to the point in the stored acoustic pattern. In one embodiment, the distance is the squared Euclidian distance which is the sum of squared differences across a set of variables. The leak detector then estimates the amount of leakage or degree of failure of the valve based on the endpoint (step 914). More specifically, the leak detector is adapted to estimate the amount of leakage or degree of failure of the valve based on the calculated distance. Finally, the leak detector 914 generates an alarm indicative of valve failure and indicative of the amount of leakage or degree of failure of the valve (step 916).

In general, the calculated distance between the endpoint and the desired point in the reference pattern may provide an indication of the degree of failure or extent of leakage. In one embodiment, the distance (D) provides an indication of the extent of leakage according to the following linear equation $$E=kD$$

where E is the extent of leakage or failure, D is the calculated distance, and k is a scalar. In this embodiment, scalar (k) may include a factor related to the fluid flow rate through the system.

In a batch process, the amount of leakage or degree of failure may provide an indication of whether a batch may be salvaged or if it must be discarded. Moreover, the degree of leakage or failure is indicative of a deviation from a reference pattern, which may be used to predict extent of fouling, corrosion, or damage to the valve seat in order to alert an operator to inspect the valve before beginning a new batch in order to avert an unexpected valve failure.

Although the present invention has been described with reference to preferred embodiments, workers skilled in the art will recognize that changes may be made in form and detail without departing from the spirit and scope of the invention.

What is claimed is:

1. A leak detection system for detecting a leak through a closed valve disposed between an upstream pipe and a downstream pipe of an industrial process, the system comprising:
   an insertable plate coupled to a valve body, the valve in the pipe in-line with the fluid flow, the insertable plate positioned between the valve body and the pipe and having an opening therethrough to allow fluid flow through the valve and the pipe;
   a sensor tap extending through the insertable plate to a lumen of the pipe; and
   a leak detector coupled to the sensor tap and adapted to detect a leak through the valve based on a measured acoustic signature.

2. The system of claim 1 wherein the leak detector is adapted to identify a leak based on differences between the measured acoustic signature and a stored reference signature.

3. The system of claim 1 wherein the leak detector is adapted to generate an alarm signal to a control center if, the measured acoustic signature differs from a stored acoustic signature by more than a predetermined limit.

4. The system of claim 1 wherein the leak detector is adapted to detect problems in fixed equipment of the industrial process based on a change in amplitude and/or frequency of background process noise in excess of a predetermined noise limit.

5. The system of claim 1 wherein the leak detector is adapted to predict an extent of a leak through the valve based on a magnitude of differences between the measured acoustic signature relative to a stored acoustic signature.

6. The system of claim 1 wherein the measured acoustic signal comprises a frequency and amplitude pattern, and wherein the leak detector is adapted to estimate an amount of fluid that has leaked through the valve based on differences between the frequency and amplitude pattern and a stored reference pattern.

7. The system of claim 6 wherein an amount of leakage is estimated based on an end point of the frequency and amplitude pattern relative to a corresponding point on the stored reference pattern.

8. The system of claim 1 wherein the insertable plate provides a variable area channel.

9. An acoustic leak detection system for detecting a fluid leak through a valve of an industrial process, the valve having an upstream passageway coupled to a downstream passageway and a valve closure element adapted to selectively close off fluid flow through the valve, the valve having one or more sensor taps extending into the valve adjacent to the downstream passageway, the system comprising:
   a leak detector coupled to the one or more sensor taps and adapted to detect a leak through the valve based on a measured acoustic signal; and
   a variable area flow region disposed adjacent to the valve closure element in the downstream passageway to funnel fluid built up away from the valve closure element, the variable area flow region adapted to make the leak detector sensitive to frequencies associated with leaks resulting in low fluid flow.

10. The system of claim 9 wherein one of the one or more sensor taps extends into the valve adjacent to the variable flow area.

11. The system of claim 9 wherein the leak detector comprises:
an acoustic transmitter adapted to detect an acoustic signal from fluid flowing through the valve; and
circuitry adapted to detect a leak through the valve based on differences between the acoustic signal and a stored reference signal.

12. The system of claim 9 wherein the leak detector comprises:
a differential pressure transmitter coupled to the one or more sensor taps having sufficient bandwidth to capture a differential acoustic signal associated with fluid flowing through the valve.

13. The system of claim 9 wherein the leak detector further comprises:
a memory adapted to store a reference acoustic pattern of a properly functioning valve.

14. The system of claim 9 wherein the leak detector comprises:
circuitry adapted to generate a diagnostic signal to a control center if differences between the measured acoustic signal and a stored reference signal exceed a predetermined limit.

15. The system of claim 9 wherein the leak detector is adapted to estimate an amount of leakage through the valve based on differences between the measured acoustic signal and a stored reference signal.

16. A leak detection system for detecting a leak through a closed valve element of a valve assembly disposed between an upstream pipe and a downstream pipe of an industrial process, the system comprising:
a first sensor disposed in an upper portion of the valve assembly downstream from the closed valve element and adapted to measure pressure in the downstream section;
a flow restriction element disposed in a bottom portion of the valve assembly downstream from the closed valve, the flow restriction element;
a cross-bore exposed to the fluid flow and extending into the flow restriction element less than a full width of the flow restriction element from a direction of the closed valve;
a second sensor disposed in a lower portion of the valve assembly and coupled to the cross-bore, the second sensor adapted to measure a static pressure in the downstream section; and
a leak detector coupled to the first and second sensors and adapted to detect a leak through the closed valve based on a differential signature.

17. The leak detection system of claim 16 wherein the flow restriction element comprises:
a variable area flow channel for channeling low fluid flow from the closed valve element to the downstream pipe.

18. The leak detection system of claim 16 wherein the flow restriction element and the first and second sensors are aligned substantially axially along an axis substantially transverse to a direction of fluid flow.

19. The leak detection system of claim 16 wherein the first sensor and the second sensor comprise pressure sensors, and wherein the differential signature comprises a differential pressure signature.

20. The leak detection system of claim 16 wherein the first sensor and the second sensor comprise pressure sensors adapted to measure pressure signals in a range of frequencies within the downstream section, and wherein the differential signature comprises a differential acoustic signature.

21. The leak detection system of claim 16 wherein the valve assembly comprises:
a valve element comprising a housing coupled between upstream and downstream pipe sections and defining a fluid passageway between the upstream and downstream pipe sections, the valve element including a valve closure element adapted to sealably close the fluid passageway; and
a plate coupled to the fluid passageway inline with the fluid flow and between the valve element and the downstream pipe section, the plate having a variable flow area on a lower portion of the insertable plate, the variable flow area adapted to channel low fluid flows between the closed valve and the downstream pipe; wherein the first and second sensors, the flow restriction area and the cross bore are disposed in the plate.

22. The leak detector of claim 21 wherein the plate comprises:
upper and lower pressure taps disposed in the plate and adapted to host the first and the second pressure sensors respectively, the lower pressure tap extending into the plate to the cross bore.

23. The leak detector of claim 21 wherein the variable flow area of the plate comprises:
a flattened area integral to a lower surface of an inside wall of the plate.

* * * * *